United States Patent
Yamada et al.

(10) Patent No.: US 7,755,847 B2
(45) Date of Patent: *Jul. 13, 2010

(54) ZOOM LENS SYSTEM, IMAGING DEVICE AND CAMERA

(75) Inventors: Katsu Yamada, Osaka (JP); Keiki Yoshitsugu, Hyogo (JP); Yoshito Miyatake, Osaka (JP); Kazuhiko Ishimaru, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/127,297

(22) Filed: May 27, 2008

(65) Prior Publication Data

US 2008/0297915 A1   Dec. 4, 2008

(30) Foreign Application Priority Data

| May 29, 2007 | (JP) | ............................... 2007-142629 |
| May 29, 2007 | (JP) | ............................... 2007-142630 |
| May 29, 2007 | (JP) | ............................... 2007-142631 |

(51) Int. Cl.
*G02B 15/14* (2006.01)

(52) U.S. Cl. ..................................... 359/689

(58) Field of Classification Search ......... 359/680–683, 359/686, 689; 396/72–88; 348/240.99–240.3
See application file for complete search history.

(56) References Cited

U.S. PATENT DOCUMENTS

| 7,023,623 | B2 * | 4/2006 | Miyatake et al. ............ 359/689 |
| 7,369,323 | B2 | 5/2008 | Yoshitsugu |
| 7,453,648 | B2 * | 11/2008 | Kurioka et al. .............. 359/682 |
| 7,599,126 | B2 | 10/2009 | Kurioka |
| 2004/0156121 | A1 | 8/2004 | Ori et al. |
| 2005/0057817 | A1 | 3/2005 | Ori |
| 2005/0141101 | A1 | 6/2005 | Itoh |
| 2005/0185287 | A1 | 8/2005 | Sekita |

(Continued)

FOREIGN PATENT DOCUMENTS

JP     2005-084597    3/2005

(Continued)

*Primary Examiner*—Darryl J Collins
*Assistant Examiner*—Zachary Wilkes
(74) *Attorney, Agent, or Firm*—Pearne & Gordon LLP

(57) ABSTRACT

A zoom lens system comprising a first lens unit having negative power, a second lens unit having positive power and a third lens unit having positive power, wherein: the first lens unit comprises a first lens element having a concave surface at least on the image side and negative power and a second lens element having a convex surface at least on the object side and positive power; the second lens unit comprises a single third lens element, a cemented lens element of two lens elements having power of mutually different signs and a single sixth lens element; in zooming, all of the lens units move along an optical axis; and conditions (I-1): $5.0 < \alpha i_W < 20.0$ and (I-2): $n_{11} \geq 1.9$ (where, $3.2 < f_T/f_W$ and $\omega_W > 35$, $\alpha i_W$ is an incident angle of a principal ray to an image sensor at a maximum image height at a wide-angle limit, $n_{11}$ is a refractive index of the first lens element to the d-line, $\omega_W$ is a half view angle at a wide-angle limit, and $f_T$ and $f_W$ are focal lengths of the entire system at a telephoto limit and a wide-angle limit, respectively) are satisfied.

43 Claims, 7 Drawing Sheets

U.S. PATENT DOCUMENTS

| | | |
|---|---|---|
| 2005/0259333 A1 | 11/2005 | Matsusaka |
| 2005/0286138 A1 | 12/2005 | Matsusaka |
| 2006/0023319 A1 | 2/2006 | Terada et al. |
| 2006/0114574 A1 | 6/2006 | Sekita |
| 2006/0132929 A1 | 6/2006 | Ito |
| 2006/0152815 A1 | 7/2006 | Satori |
| 2006/0176575 A1 | 8/2006 | Katakura |
| 2006/0285223 A1 | 12/2006 | Watanabe et al. |
| 2007/0171541 A1 | 7/2007 | Ito |
| 2007/0217025 A1* | 9/2007 | Kurioka ...................... 359/689 |

FOREIGN PATENT DOCUMENTS

| | | |
|---|---|---|
| JP | 2005-134746 | 5/2005 |
| JP | 2005-331860 | 12/2005 |
| JP | 2006-011096 | 1/2006 |
| JP | 2006-023679 | 1/2006 |
| JP | 2006-039180 | 2/2006 |
| JP | 2006-065034 | 3/2006 |
| JP | 2006-084829 | 3/2006 |
| JP | 2006-139187 | 6/2006 |
| JP | 2006-171421 | 6/2006 |
| JP | 2006-194974 | 7/2006 |
| JP | 2006-208890 | 8/2006 |
| JP | 2006-220715 | 8/2006 |
| JP | 2006-350027 | 12/2006 |

* cited by examiner

ZOOM LENS SYSTEM, IMAGING DEVICE AND CAMERA

CROSS-REFERENCE TO RELATED APPLICATION

This application is based on application Nos. 2007-142629, 2007-142630 and 2007-142631 filed in Japan on May 29, 2007, the contents of which are hereby incorporated by reference.

BACKGROUND OF THE INVENTION

1. Field of the Invention

The present invention relates to a zoom lens system, an imaging device and a camera. In particular, the present invention relates to: a zoom lens system that has a remarkably reduced thickness at the time of accommodation so as to be suitable for a lens barrel of so-called retraction type and that is still provided with a wide view angle at a wide-angle limit and with a zooming ratio exceeding 3.2; an imaging device employing this zoom lens system; and a thin and compact camera employing this imaging device.

2. Description of the Background Art

Remarkably strong demands are present for size reduction of cameras such as digital still cameras and digital video cameras (simply referred to as digital cameras, hereinafter) provided with an image sensor for performing photoelectric conversion. In particular, in digital cameras provided with a zoom lens system having a zooming ratio of 3 or the like, which are most frequent in the number of sales in the market, popularity goes to a construction of external structure in which at the time of accommodation (at the time of non-image taking), the overall length of the lens barrel is reduced (lens barrel is retracted) so that the lens barrel itself does not protrude outside. Further, in recent years, zoom lens systems are also desired that have a wide angle range where the image taking field is large.

As zoom lens systems suitable for the above-mentioned digital cameras, for example, the following zoom lens systems are proposed.

For example, Japanese Laid-Open Patent Publication No. 2005-331860 discloses a variable magnification optical system, in order from the object side, including a first lens unit having negative optical power and a second lens unit having positive optical power, wherein: at the time of magnification change from a wide-angle limit to a telephoto limit, the interval between the first and the second lens units is reduced; the first lens unit is composed of two or more lenses; and at least three lens units are each composed solely of a single lens or a cemented lens.

Japanese Laid-Open Patent Publication No. 2006-011096 discloses a variable magnification optical system, in order from the object side, including a first lens unit having negative optical power and a second lens unit having positive optical power each composed of a plurality of lenses, wherein: at the time of magnification change from a wide-angle limit to a telephoto limit, the interval between the first and the second lens units is reduced; the first lens unit has at least one aspheric surface; and a predetermined condition is satisfied by all of the maximum of the refractive index difference (absolute value) of the two lenses in the first lens unit, the composite focal length of the second lens unit, and the optical axial distance from the surface vertex of the most-image-sensor-side lens surface to the image sensor surface at a telephoto limit.

Japanese Laid-Open Patent Publication No. 2006-023679 discloses a zoom lens, in order from the object side to the image side, comprising a first lens unit having negative refractive power and a second lens unit having positive refractive power, wherein: the interval between the two lens units varies during the zooming; the first lens unit comprises a lens 11 having negative refractive power and a lens 12 having positive refractive power; the second lens unit comprises a lens 21 having positive refractive power and a lens 22 having negative refractive power; and the Abbe numbers of the lens 21 and the lens 22 satisfy a predetermined condition.

Japanese Laid-Open Patent Publication No. 2006-065034 discloses a zoom lens, in order from the object side to the image side, comprising a first lens unit having negative refractive power, a second lens unit having positive refractive power and a third lens unit having positive refractive power, wherein: the intervals between the individual lens units vary during the zooming; the first lens unit is composed of one negative lens and one positive lens; the second lens unit comprises a second-a lens unit composed of one positive lens and one negative lens and a second-b lens unit that is arranged on the image side of the second-a lens unit and that has at least one positive lens; the third lens unit has at least one positive lens; and a predetermined condition is satisfied by the image magnifications at a wide-angle limit and a telephoto limit of the second lens unit, the interval between the first and the second lens units at a wide-angle limit, and the interval between the second and the third lens units at a telephoto limit.

Japanese Laid-Open Patent Publication No. 2006-084829 discloses a zoom lens, in order from the object side to the image side, comprising a first lens unit having negative refractive power, a second lens unit having positive refractive power and a third lens unit having positive refractive power, wherein: the intervals between the individual lens units vary during the zooming; the second lens unit comprises a second-a lens unit composed of, in order from the object side to the image side, a positive lens and a negative lens and a second-b lens unit that is arranged on the image side of the second-a lens unit and that has at least one positive lens; and a predetermined condition is satisfied by the half view angle at a wide-angle limit, the focal lengths of the first and the second lens units and the focal length of the entire system at a wide-angle limit.

Japanese Laid-Open Patent Publication No. 2006-139187 discloses a zoom lens, in order from the object side, comprising a first lens unit having negative refractive power, a second lens unit having positive refractive power and a third lens unit having positive refractive power, wherein: the intervals between the individual lens units are changed so that variable magnification is achieved; the second lens unit is composed of two lens components consisting of a single lens on the object side and a lens component on the image side; and a predetermined condition is satisfied by the radii of curvature of the single lens on the object side and the image side and the lens optical axial thickness of the single lens.

Japanese Laid-Open Patent Publication No. 2006-171421 discloses a zoom lens, in order from the object side to the image side, comprising a first lens unit having negative refractive power, a second lens unit having positive refractive power and a third lens unit having positive refractive power, wherein: the intervals between the individual lens units vary during the zooming; the first lens unit, in order from the object side to the image side, comprises one negative lens and one positive lens; the second lens unit, in order from the object side to the image side, comprises a positive lens, a positive lens, a negative lens and a positive lens; and during the zooming from a wide-angle limit to a telephoto limit, the third lens unit moves to the image side.

Japanese Laid-Open Patent Publication No. 2006-208890 discloses a zoom lens, in order from the object side to the image side, comprising a first lens unit having negative refractive power, a second lens unit having positive refractive power and a third lens unit having positive refractive power, wherein: the intervals between the individual lens units vary during the zooming; and a predetermined condition is satisfied by the amount of movement of the second lens unit during the zooming from a wide-angle limit to a telephoto limit, the interval between the second and the third lens units at a wide-angle limit, the focal lengths of the first and the second lens units and the focal length of the entire system at a wide-angle limit.

Japanese Laid-Open Patent Publication No. 2006-350027 discloses a zoom lens, in order from the object side, comprising at least a first lens unit composed of two components and a second lens unit composed of one component, wherein: at the time of magnification change, at least the interval between the first and the second lens units varies; the first and the second lens units have aspheric surfaces; and a predetermined condition is satisfied by the paraxial radius of curvature of at least one aspheric surface A of the first lens unit and the distance between the intersecting point where the most off-axis principal ray passes through the aspheric surface A and the optical axis.

Japanese Laid-Open Patent Publication No. 2006-194974 discloses a zoom lens, in order from the object side to the image side, comprising a first lens unit having negative refractive power and a second lens unit having positive refractive power, wherein: the interval between the individual units is changed so that magnification change from a wide-angle limit to a telephoto limit is achieved; the first lens unit is, in order from the object side, composed of two lenses consisting of a negative lens and a positive lens; and a predetermined condition is satisfied by the Abbe number of the positive lens, the refractive index of the positive lens and the refractive index of the negative lens.

Japanese Laid-Open Patent Publication No. 2006-220715 discloses a zoom lens, in order from the object side, comprising a first lens unit having negative refractive power, a second lens unit having positive refractive power and a third lens unit having positive refractive power, wherein: the intervals between the individual lens units are changed so that variable magnification is achieved; the first lens unit is composed of two lenses consisting of a negative lens and a positive lens; the second lens unit comprises two positive lenses and one negative lens; the third lens unit is composed of one positive lens; and a predetermined condition is satisfied by the refractive index of the negative lens and the refractive index of the positive lens in the first lens unit.

The optical systems disclosed in the above-mentioned publications have zooming ratios sufficient for application to digital cameras. Nevertheless, width of the view angle at a wide-angle limit and size reduction are not simultaneously realized. In particular, from the viewpoint of size reduction, requirements in digital cameras of recent years are not satisfied.

SUMMARY OF THE INVENTION

An object of the present invention is to realize: a zoom lens system that has a remarkably reduced thickness at the time of accommodation so as to be suitable for a lens barrel of so-called retraction type and that is still provided with a wide view angle at a wide-angle limit and with a zooming ratio of 3 or the like; an imaging device employing this zoom lens system; and a thin and compact camera employing this imaging device.

The novel concepts disclosed herein were achieved in order to solve the foregoing problems in the conventional art, and herein is disclosed:

a zoom lens system, in order from the object side to the image side, comprising a first lens unit having negative optical power, a second lens unit having positive optical power and a third lens unit having positive optical power, wherein the first lens unit is composed of two lens elements, in order from the object side to the image side, comprising a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1) and (I-2) are satisfied:

$$5.0 < \alpha i_W < 20.0 \quad (1)$$

$$n_{11} \geq 1.9 \quad (I\text{-}2)$$

(here, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{11}$ is a refractive index of the first lens element to the d-line, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the system, in order from the object side to the image side, comprises a first lens unit having negative optical power, a second lens unit having positive optical power and a third lens unit having positive optical power, wherein the first lens unit is composed of two lens elements, in order from the object side to the image side, comprising a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1) and (I-2) are satisfied:

$$5.0 < \alpha i_W < 20.0 \quad (1)$$

$$n_{11} \geq 1.9 \quad (I\text{-}2)$$

(here, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{11}$ is a refractive index of the first lens element to the d-line, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device having a zoom lens system that forms the optical image of the object and an image sensor that converts the optical image formed by the zoom lens system into the electric image signal, wherein in the zoom lens system, the system, in order from the object side to the image side, comprises a first lens unit having negative optical power, a second lens unit having positive optical power and a third lens unit having positive optical power, wherein the first lens unit is composed of two lens elements, in order from the object side to the image side, comprising a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1) and (I-2) are satisfied:

$$5.0 < \alpha i_W < 20.0 \quad (1)$$

$$n_{11} \geq 1.9 \quad (I\text{-}2)$$

(here, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{11}$ is a refractive index of the first lens element to the d-line, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a zoom lens system, in order from the object side to the image side, comprising a first lens unit having negative optical power, a second lens unit having positive optical power and a third lens unit having positive optical power, wherein the first lens unit is composed of two lens elements, in order from the object side to the image side, comprising a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1) and (II-2) are satisfied:

$$5.0 < \alpha i_W < 20.0 \quad (1)$$

$$(n_{11}-1)\cdot(n_{12}-1) \geq 0.84 \quad (II\text{-}2)$$

(here, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{11}$ is a refractive index of the first lens element to the d-line, $n_{12}$ is a refractive index of the second lens element to the d-line, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the system, in order from the object side to the image side, comprises a first lens unit having negative optical power, a second lens unit having positive optical power and a third lens unit having positive optical power, wherein the first lens unit is composed of two lens elements, in order from the object side to the image side, comprising a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1) and (II-2) are satisfied:

$$5.0 < \alpha i_W < 20.0 \qquad (1)$$

$$(n_{11}-1) \cdot (n_{12}-1) \geq 0.84 \qquad (II-2)$$

(here, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{11}$ is a refractive index of the first lens element to the d-line, $n_{12}$ is a refractive index of the second lens element to the d-line, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device having a zoom lens system that forms the optical image of the object and an image sensor that converts the optical image formed by the zoom lens system into the electric image signal, wherein in the zoom lens system, the system, in order from the object side to the image side, comprises a first lens unit having negative optical power, a second lens unit having positive optical power and a third lens unit having positive optical power, wherein the first lens unit is composed of two lens elements, in order from the object side to the image side, comprising a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1) and (II-2) are satisfied:

$$5.0 < \alpha i_W < 20.0 \qquad (1)$$

$$(n_{11}-1) \cdot (n_{12}-1) \geq 0.84 \qquad (II-2)$$

(here, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{11}$ is a refractive index of the first lens element to the d-line, $n_{12}$ is a refractive index of the second lens element to the d-line, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a zoom lens system, in order from the object side to the image side, comprising a first lens unit having negative optical power, a second lens unit having positive optical power and a third lens unit having positive optical power, wherein the first lens unit is composed of two lens elements, in order from the object side to the image side, comprising a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1) and (III-2) are satisfied:

$$5.0 < \alpha i_W < 20.0 \qquad (1)$$

$$n_{12} \geq 2.1 \qquad (III-2)$$

(here, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{12}$ is a refractive index of the second lens element to the d-line, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the system, in order from the object side to the image side, comprises a first lens unit having negative optical power, a second lens unit having positive optical power and a third lens unit having positive optical power, wherein the first lens unit is composed of two lens elements, in order from the object side to the image side, comprising a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1) and (III-2) are satisfied:

$$5.0 < \alpha i_W < 20.0 \tag{1}$$

$$n_{12} \geq 2.1 \tag{III-2}$$

(here, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{12}$ is a refractive index of the second lens element to the d-line, $\omega_W$ is a half view angle (°) at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device having a zoom lens system that forms the optical image of the object and an image sensor that converts the optical image formed by the zoom lens system into the electric image signal, wherein in the zoom lens system, the system, in order from the object side to the image side, comprises a first lens unit having negative optical power, a second lens unit having positive optical power and a third lens unit having positive optical power, wherein the first lens unit is composed of two lens elements, in order from the object side to the image side, comprising a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1) and (III-2) are satisfied:

$$5.0 < \alpha i_W < 20.0 \tag{1}$$

$$n_{12} \geq 2.1 \tag{III-2}$$

(here, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{12}$ is a refractive index of the second lens element to the d-line, $\omega_W$ is a half view angle (°) at a wide-angle limit, $f_T$ is a focal length of the entire system at a telephoto limit, and $f_W$ is a focal length of the entire system at a wide-angle limit.

The present invention can provide a zoom lens system that has a remarkably reduced thickness at the time of accommodation so as to be suitable for a lens barrel of so-called retraction type and that is still provided with a wide view angle at a wide-angle limit and with a zooming ratio exceeding 3.2. Further, according to the present invention, an imaging device employing this zoom lens system and a thin and compact camera employing this imaging device can be provided.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments I-1 to I-2, II-1 to II-2 and III-1 to III-2

Figure 1:
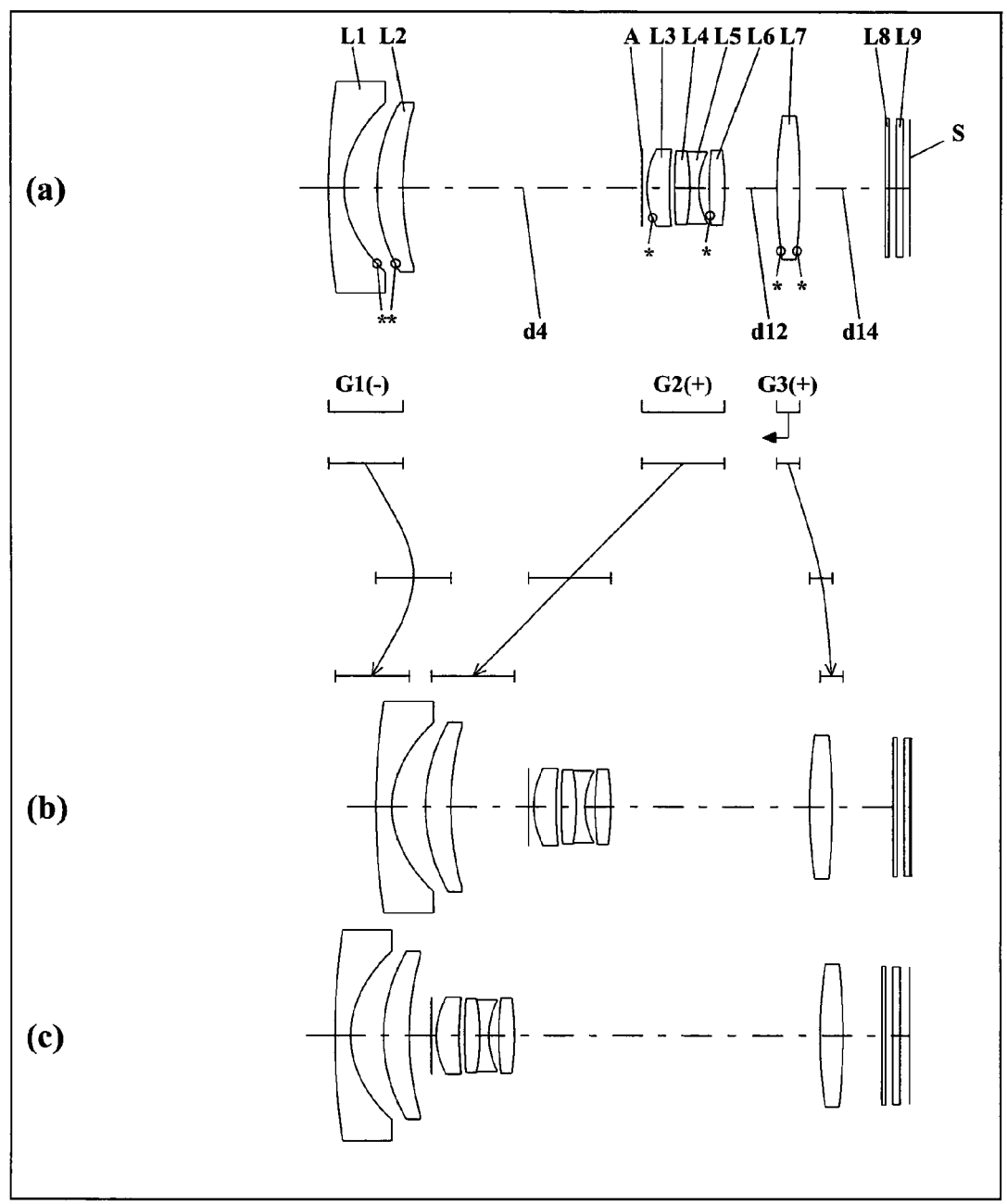
FIGS. 1a-1c are lens arrangement diagrams showing an infinity in-focus condition of a zoom lens system according to Embodiments I-1, II-1 and III-1 (Examples I-1, II-1 and III-1)
Figure 4:
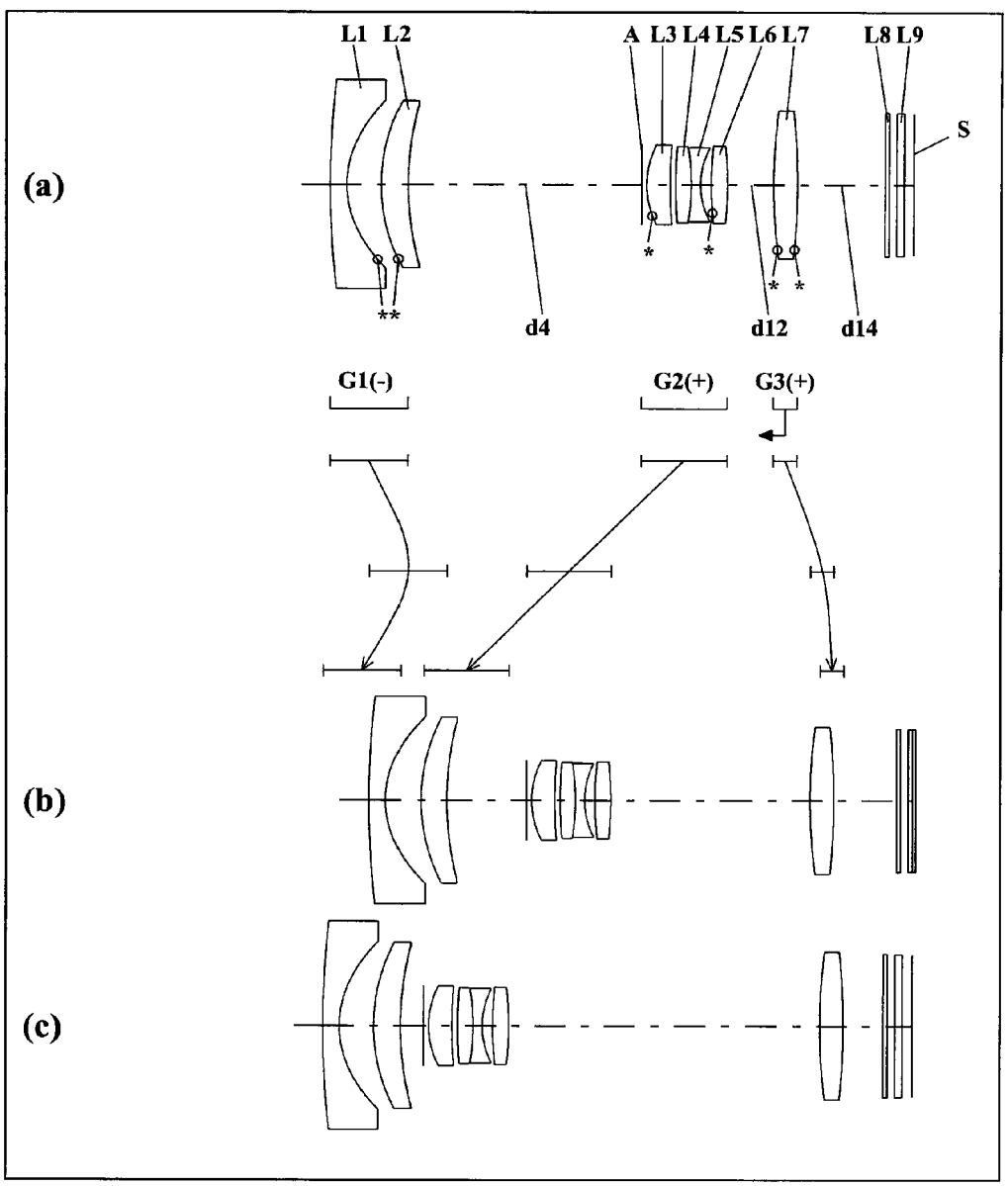
FIGS. 4a-4c are lens arrangement diagrams showing an infinity in-focus condition of a zoom lens system according to Embodiments I-2, II-2 and III-2 (Examples I-2, II-2 and III-2)

FIG. 1 is a lens arrangement diagram of a zoom lens system according to Embodiments I-1, II-1 and III-1. FIG. 4 is a lens arrangement diagram of a zoom lens system according to Embodiments I-2, II-2 and III-2.

FIGS. 1 and 4 show respectively a zoom lens system in an infinity in-focus condition. In each figure, part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W \cdot f_T)}$), and part (c) shows a lens configuration at a telephoto limit (in the maximum focal length condition: focal length $f_T$). Further, in each figure, straight or curved arrows provided between part (a) and part (b) show the movement of each lens unit from the wide-angle limit to the telephoto limit through the middle position. Moreover, in each figure, an arrow provided to a lens unit indicates focusing from an infinity in-focus condition to a close-object focusing state, that is, the moving direction at the time of focusing from an infinity in-focus condition to a close-object focusing state.

The zoom lens system according to each embodiment, in order from the object side to the image side, comprises a first lens unit G1 having negative optical power, a second lens unit G2 having positive optical power and a third lens unit G3 having positive optical power. Then, in zooming from a wide-angle limit to a telephoto limit, the first lens unit G1, the second lens unit G2 and the third lens unit G3 all move along the optical axis (this lens configuration is referred to as the basic configuration of the embodiments, hereinafter). In the zoom lens system according to each embodiment, these lens units are arranged into a desired optical power arrangement, so that a zooming ratio exceeding 3.2 and high optical performance are achieved and still size reduction is realized in the entire lens system.

In FIGS. 1 and 4, an asterisk "*" provided to a particular surface indicates that the surface is aspheric. Further, in each figure, a symbol (+) or (−) provided to the sign of each lens unit corresponds to the sign of optical power of the lens unit. Moreover, in each figure, the straight line located on the most right-hand side indicates the position of an image surface S. On the object side relative to the image surface S (between the image surface S and each of the most image side lens surfaces of third lens unit G3), two plane parallel plates such as optical low-pass filters and face plates of an image sensor are provided. Moreover, in each figure, a diaphragm A is provided between the most image side lens surface of the first lens unit G1 and each of the most object side lens surfaces of the second lens unit G2.

As shown in FIG. 1, in the zoom lens system according to Embodiment I-1, the first lens unit G1, in order from the object side to the image side, comprises: a negative meniscus first lens element L1 with the convex surface facing the object side; and a positive meniscus second lens element L2 with the convex surface facing the object side. The first lens element L1 has a refractive index to the d-line as high as 1.9 or greater.

Further, in the zoom lens system according to Embodiment II-1, the first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 have high refractive indices to the d-line.

Further, in the zoom lens system according to Embodiment III-1, the first lens unit G1, in order from the object side to the image side, comprises: a negative meniscus first lens element L1 with the convex surface facing the object side; and a positive meniscus second lens element L2 with the convex surface facing the object side. The second lens element L2 has a refractive index to the d-line as high as 2.1 or greater.

In each zoom lens system according to Embodiments I-1, II-1 and III-1, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other.

Further, in each zoom lens system according to Embodiments I-1, II-1 and III-1, the third lens unit G3 comprises solely a bi-convex seventh lens element L7.

Here, in each zoom lens system according to Embodiments I-1, II-1 and III-1, parallel plates L8 and L9 are, in order from the object side to the image side, provided on the object side relative to the image surface S (between the image surface S and the seventh lens element L7).

In each zoom lens system according to Embodiments I-1, II-1 and III-1, in zooming from a wide-angle limit to a telephoto limit, the first lens unit G1 moves with locus of a convex to the image side with changing the interval with the second lens unit G2, while the second lens unit G2 moves to the object side, and while the third lens unit G3 moves to the image side.

In the zoom lens system according to Embodiment I-1, in particular, as shown later in Table I-7, the first lens element L1 that constitutes the first lens unit G1 and that has a concave surface on the image side and negative optical power is provided with a high refractive index. Thus, in the first lens element L1, when the thickness of a part where the light ray height is great is set up appropriately, the lens thickness, especially, the edge thickness, can be reduced. Accordingly, the zoom lens system according to Embodiment I-1 has a reduced overall optical length at the time of non-use.

In the zoom lens system according to Embodiment II-1, in particular, as shown later in Table II-7, the first lens element L1 having a concave surface on the image side and negative optical power and the second lens element L2 having a convex surface on the object side and positive optical power, which constitute the first lens unit G1, have high refractive indices. As such, when both of the first lens element L1 and the second lens element L2 have high refractive indices, the optical axial lens thicknesses of these lens elements can be reduced, while the radii of curvature of the lenses can be increased. Further, when the refractive index difference of these lens elements is reduced, control of the Petzval sum becomes easy. This permits appropriate compensation of curvature of field. Further, aberration compensation can be performed without the necessity of using a surface having a small radius of curvature and hence strong optical power. This permits easy compensation of off-axial aberration, especially, distortion and astigmatism at a wide-angle limit, which easily causes a problem especially in a zoom lens system having a wide view angle at a wide-angle limit.

In the zoom lens system according to Embodiment III-1, in particular, as shown later in Table III-7, the second lens element L2 that constitutes the first lens unit G1 and that has a convex surface on the object side and positive optical power is provided with a remarkably high refractive index. Thus, in the second lens element L2, the optical axial lens thickness can be reduced, while the radius of curvature of the lens can be increased. Accordingly, the zoom lens system according to Embodiment III-1 has a reduced overall optical length at the time of non-use.

Further, in each zoom lens system according to Embodiments I-1, II-1 and III-1, the second lens unit G2 comprises: a third lens element L3 being a single lens element; a cemented lens element fabricated by cementing a fourth lens element L4 having positive optical power and a fifth lens element L5 having negative optical power; and a sixth lens element L6 being a single lens element. Thus, in each zoom lens system according to Embodiments I-1, II-1 and III-1, change of axial spherical aberration at the time of magnification change can be compensated appropriately. Further, like in each zoom lens system according to Embodiments I-1, II-1 and III-1, when the entire optical power is increased by employing a glass material having a high refractive index in the first lens unit G1, the incident angle of the principal ray that enters the second lens unit G2 increases. However, when the second lens unit G2 has the above-mentioned configuration, off-axial aberration generated in such a case can be compensated appropriately. Thus, the interval between the first lens unit G1 and the second lens unit G2 can be reduced, so that size reduction of each zoom lens system can be realized. Further, it is preferable that like in each zoom lens system according to Embodiments I-1, II-1 and III-1, the object side surfaces of the third lens element L3 and the fourth lens element L4 are convex and the image side surface of the fifth lens element L5 is concave. According to this configuration, axial spherical aberration and off-axial coma aberration can simultaneously be compensated satisfactory.

As shown in FIG. 4, in the zoom lens system according to Embodiment I-2, the first lens unit G1, in order from the object side to the image side, comprises: a negative meniscus first lens element L1 with the convex surface facing the object side; and a positive meniscus second lens element L2 with the convex surface facing the object side. The first lens element L1 has a refractive index to the d-line as high as 1.9 or greater.

Further, in the zoom lens system according to Embodiment II-2, the first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 have high refractive indices to the d-line.

Further, in the zoom lens system according to Embodiment III-2, the first lens unit G1, in order from the object side to the image side, comprises: a negative meniscus first lens element L1 with the convex surface facing the object side; and a positive meniscus second lens element L2 with the convex surface facing the object side. The second lens element L2 has a refractive index to the d-line as high as 2.1 or greater.

In each zoom lens system according to Embodiments I-2, II-2 and III-2, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other.

Further, in each zoom lens system according to Embodiments I-2, II-2 and III-2, the third lens unit G3 comprises solely a bi-convex seventh lens element L7.

Here, in each zoom lens system according to Embodiments I-2, II-2 and III-2, parallel plates L8 and L9 are, in order from the object side to the image side, provided on the object side relative to the image surface S (between the image surface S and the seventh lens element L7).

In each zoom lens system according to Embodiments I-2, II-2 and III-2, in zooming from a wide-angle limit to a telephoto limit, the first lens unit G1 moves with locus of a convex to the image side with changing the interval with the second lens unit G2, while the second lens unit G2 moves to the object side, and while the third lens unit G3 moves to the image side.

In the zoom lens system according to Embodiment I-2, in particular, as shown later in Table I-7, the first lens element L1 that constitutes the first lens unit G1 and that has a concave surface on the image side and negative optical power is provided with a high refractive index. Thus, in the first lens element L1, when the thickness of a part where the light ray height is great is set up appropriately, the lens thickness, especially, the edge thickness, can be reduced. Accordingly, the zoom lens system according to Embodiment I-2 has a reduced overall optical length at the time of non-use.

In the zoom lens system according to Embodiment II-2, in particular, as shown later in Table II-7, the first lens element L1 having a concave surface on the image side and negative optical power and the second lens element L2 having a convex surface on the object side and positive optical power, which constitute the first lens unit G1, have high refractive indices. As such, when both of the first lens element L1 and the second lens element L2 have high refractive indices, the optical axial lens thicknesses of these lens elements can be reduced, while the radii of curvature of the lenses can be increased. Further, when the refractive index difference of these lens elements is reduced, control of the Petzval sum becomes easy. This permits appropriate compensation of curvature of field. Further, aberration compensation can be performed without the necessity of using a surface having a small radius of curvature and hence strong optical power. This permits easy compensation of off-axial aberration, especially, distortion and astigmatism at a wide-angle limit, which easily causes a problem especially in a zoom lens system having a wide view angle at a wide-angle limit.

In the zoom lens system according to Embodiment III-2, in particular, as shown later in Table III-7, the second lens element L2 that constitutes the first lens unit G1 and that has a convex surface on the object side and positive optical power is provided with a remarkably high refractive index. Thus, in the second lens element L2, the optical axial lens thickness can be reduced, while the radius of curvature of the lens can be increased. Accordingly, the zoom lens system according to Embodiment III-2 has a reduced overall optical length at the time of non-use.

Further, in each zoom lens system according to Embodiments I-2, II-2 and III-2, the second lens unit G2 comprises: a third lens element L3 being a single lens element; a cemented lens element fabricated by cementing a fourth lens element L4 having positive optical power and a fifth lens element L5 having negative optical power; and a sixth lens element L6 being a single lens element. Thus, in each zoom lens system according to Embodiments I-2, II-2 and III-2, change of axial spherical aberration at the time of magnification change can be compensated appropriately. Further, like in each zoom lens system according to Embodiments I-2, II-2 and III-2, when the entire optical power is increased by employing a glass material having a high refractive index in the first lens unit G1, the incident angle of the principal ray that enters the second lens unit G2 increases. However, when the second lens unit G2 has the above-mentioned configuration, off-axial aberration generated in such a case can be compensated appropriately. Thus, the interval between the first lens unit G1 and the second lens unit G2 can be reduced, so that size reduction of each zoom lens system can be realized. Further, it is preferable that like in each zoom lens system according to Embodiments I-2, II-2 and III-2, the object side surfaces of the third lens element L3 and the fourth lens element L4 are convex and the image side surface of the fifth lens element L5 is concave. According to this configuration, axial spherical aberration and off-axial coma aberration can simultaneously be compensated satisfactory.

In the zoom lens system according to each embodiment, in zooming from a wide-angle limit to a telephoto limit, the first lens unit G1, the second lens unit G2 and the third lens unit G3 all move along the optical axis. Also, among these lens units, for example, the second lens unit G2 is moved in a direction perpendicular to the optical axis, so that image blur caused by hand blurring, vibration and the like can be compensated optically.

In the present invention, when the image blur is to be compensated optically, the second lens unit moves in a direction perpendicular to the optical axis as described above, so that image blur is compensated in a state that size increase in the entire zoom lens system is suppressed and a compact construction is realized and that excellent imaging characteristics such as small decentering coma aberration and decentering astigmatism are satisfied.

Conditions are described below that are preferable to be satisfied by a zoom lens system having the above-mentioned basic configuration like each zoom lens system according to Embodiments I-1 to I-2, II-1 to II-2 and III-1 to III-2. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

Further, all conditions described below hold only under the following two premise conditions (A) and (B), unless noticed otherwise.

$$3.2 < f_T/f_W \qquad (A)$$

$$\omega_W > 35 \qquad (B)$$

where, $\omega_W$ is a half view angle (°) at a wide-angle limit, $f_T$ is a focal length of the entire system at a telephoto limit, and $f_W$ is a focal length of the entire system at a wide-angle limit.

Here, the condition (B) is replaced by the following condition (B)', the effect obtained by virtue of each condition described below is achieved more successfully.

$$\omega_W > 38 \qquad (B)'$$

In a zoom lens system having the above-mentioned basic configuration like each zoom lens system according to Embodiments I-1 to I-2, II-1 to II-2 and III-1 to III-2, the following condition (1) is satisfied.

$$5.0 < \alpha i_W < 20.0 \qquad (1)$$

where, $\alpha i_W$ is an incident angle of a principal ray to an image sensor at a maximum image height at a wide-angle limit (defined as positive when the principal ray is incident on a light acceptance surface of the image sensor in a state of departing from the optical axis).

The condition (1) sets forth the incident angle of the principal ray to the image sensor at the maximum image height at a wide-angle limit. When the condition (1) is satisfied, the incident angle at which the most off-axis principal ray enters the image sensor becomes small. This reduces the influence of shading. When the value exceeds the upper limit of the condition (1), the influence of shading in the image sensor reduces the amount of periphery light. In contrast, when the value goes below the lower limit of the condition (1), the angle of the negative most off-axis principal ray at a telephoto limit becomes large at the time of magnification change. This reduces the amount of periphery light especially a telephoto limit.

Here, the following condition (1)' is further satisfied, a change is suppressed in the incident angle of the principal ray to the image sensor at the maximum image height during the zooming. This reduces also a fluctuation in the amount of periphery light. Thus, this situation is remarkably effective.

$$\alpha i_W < 15.0 \qquad (1)'$$

Here, in a zoom lens system having the above-mentioned basic configuration like each zoom lens system according to Embodiments I-1 to I-2, the following condition (I-2) is satisfied simultaneously to the above-mentioned condition (1).

$$n_{11} \geqq 1.9 \qquad (I-2)$$

where, $n_{11}$ is a refractive index of the first lens element to the d-line.

The condition (I-2) sets forth the refractive index of the first lens element. When the condition (I-2) is satisfied, the center thickness of the first lens element is reduced. Further, even when the curvature, especially, the curvature on the image side, is not increased, curvature of field on the wide-angle side is suppressed. Further, when the condition (I-2) is satisfied, a shape can be ensured that is effective especially for compensation of distortion and astigmatism at a wide-angle limit.

In a zoom lens system having the above-mentioned basic configuration like each zoom lens system according to Embodiments I-1 to I-2, it is preferable that the following condition (I-3) is satisfied.

$$0.8 < (n_{11}-1)^2 < 1.5 \qquad (I-3)$$

where, $n_{11}$ is a refractive index of the first lens element to the d-line.

The condition (I-3) sets forth the refractive index of the first lens element. When the condition (I-3) is satisfied, the center thickness of the first lens element is reduced. Further, even when the curvature, especially, the curvature on the image side, is not increased, curvature of field on the wide-angle side is suppressed. Further, when the condition (I-3) is satisfied, a shape can be ensured that is effective especially for compensation of distortion and astigmatism at a wide-angle limit. Here, in the first lens element, it is preferable that in a state that the above-mentioned condition (I-3) is satisfied, the image side surface is made aspheric. When the image side surface of the first lens element is made aspheric, off-axial aberration, especially, distortion and astigmatism at a wide-angle limit, can be compensated effectively.

In a zoom lens system having the above-mentioned basic configuration like each zoom lens system according to Embodiments I-1 to I-2, it is preferable that the following condition (I-4) is satisfied.

$$0.75 < (n_{11}-1) \cdot f_W/r_{12} < 1.2 \qquad (I-4)$$

where, $r_{12}$ is a radius of curvature of the image side surface of the first lens element, $n_{11}$ is a refractive index of the first lens element to the d-line, and $f_W$ is a focal length of the entire system at a wide-angle limit.

The condition (I-4) sets forth the refractive index of the first lens element. When the value exceeds the upper limit of the condition (I-4), the radius of curvature of the image side surface of the first lens element becomes excessively small, and hence fabrication becomes difficult. Thus, this situation is not preferable. In contrast, when the value goes below the lower limit of the condition (I-4), the optical power of the image side surface of the first lens element becomes excessively weak. Thus, compensation of the above-mentioned off-axial aberration, especially, distortion and astigmatism at a wide-angle limit, becomes insufficient. Accordingly, this situation is not preferable. Here, in the first lens element, it is preferable that in a state that the above-mentioned condition (I-4) is satisfied, the image side surface is made aspheric. When the image side surface of the first lens element is made aspheric, off-axial aberration, especially, distortion and astigmatism at a wide-angle limit, can be compensated effectively.

Further, in a zoom lens system having the above-mentioned basic configuration like each zoom lens system according to Embodiments II-1 to II-2, the following condition (II-2) is satisfied simultaneously to the above-mentioned condition (1).

$$(n_{11}-1) \cdot (n_{12}-1) \geqq 0.84 \quad \text{(II-2)}$$

where, $n_{11}$ is a refractive index of the first lens element to the d-line, and $n_{12}$ is a refractive index of the second lens element to the d-line.

The condition (II-2) sets forth the refractive indices of the first lens element and the second lens element. When the condition (II-2) is satisfied, the optical axial lens thicknesses of these lens elements can be reduced, while the radii of curvature of the lenses can be increased. Further, when the condition (II-2) is satisfied, control of the Petzval sum by means of reducing the refractive index difference of these lens elements becomes easy. Thus, in a zoom lens system having the basic configuration, adjustment is performed such that the range of the condition (II-2) should not be exceeded. Here, it is preferable that the first lens element satisfies the above-mentioned condition (II-2) and simultaneously has an aspheric image side surface and that the second lens element satisfies the above-mentioned condition (II-2) and simultaneously has an aspheric object side surface. As such, when the two opposing surfaces of the first lens element and the second lens element are made aspheric, off-axial aberration, especially, distortion and astigmatism at a wide-angle limit, can be compensated effectively.

Further, in a zoom lens system having the above-mentioned basic configuration like each zoom lens system according to Embodiments III-1 to III-2, the following condition (III-2) is satisfied simultaneously to the above-mentioned condition (1).

$$n_{12} \geqq 2.1 \quad \text{(III-2)}$$

where, $n_{12}$ is a refractive index of the second lens element to the d-line.

The condition (III-2) sets forth the refractive index of the second lens element. When the condition (III-2) is satisfied, the center thickness of the second lens element is reduced. Further, even when the curvature, especially, the curvature on the object side, is not increased, curvature of field on the wide-angle side is suppressed. Further, when the condition (III-2) is satisfied, a shape can be ensured that is effective especially for compensation of distortion and astigmatism at a wide-angle limit.

In a zoom lens system having the above-mentioned basic configuration like each zoom lens system according to Embodiments III-1 to III-2, it is preferable that the following condition (III-3) is satisfied.

$$0.8 < (n_{12}-1)^2 < 1.5 \quad \text{(III-3)}$$

where, $n_{12}$ is a refractive index of the second lens element to the d-line.

The condition (III-3) sets forth the refractive index of the second lens element. When the condition (III-3) is satisfied, the center thickness of the second lens element is reduced. Further, even when the curvature, especially, the curvature on the image side, is not increased, curvature of field on the wide-angle side is suppressed. Further, when the condition (III-3) is satisfied, a shape can be ensured that is effective especially for compensation of distortion and astigmatism at a wide-angle limit. Here, in the second lens element, it is preferable that in a state that the above-mentioned condition (III-3) is satisfied, the object side surface is made aspheric. When the object side surface of the second lens element is made aspheric, off-axial aberration, especially, distortion and astigmatism at a wide-angle limit, can be compensated effectively.

In a zoom lens system having the above-mentioned basic configuration like each zoom lens system according to Embodiments III-1 to III-2, it is preferable that the following condition (III-4) is satisfied.

$$0.4 < (n_{12}-1) \cdot f_W / r_{21} < 0.7 \quad \text{(III-4)}$$

where, $r_{21}$ is a radius of curvature of the object side surface of the second lens element, $n_{12}$ is a refractive index of the second lens element to the d-line, and $f_W$ is a focal length of the entire system at a wide-angle limit.

The condition (III-4) sets forth the refractive index of the second lens element. When the condition (III-4) is satisfied, the center thickness of the second lens element is reduced. Further, even when the curvature, especially, the curvature on the image side, is not increased, curvature of field on the wide-angle side is suppressed. Further, when the condition (III-4) is satisfied, a shape can be ensured that is effective especially for compensation of distortion and astigmatism at a wide-angle limit. Here, in the second lens element, it is preferable that in a state that the above-mentioned condition (III-4) is satisfied, the object side surface is made aspheric. When the object side surface of the second lens element is made aspheric, off-axial aberration, especially, distortion and astigmatism at a wide-angle limit, can be compensated effectively.

In a zoom lens system having the above-mentioned basic configuration like each zoom lens system according to Embodiments I-1 to I-2, II-1 to II-2 and III-1 to III-2, it is preferable that the following condition (5) is satisfied.

$$0.1 < (n_{11}-1) \cdot (n_{12}-1) \cdot d \cdot f_W / (r_{12} \cdot r_{21}) < 0.3 \quad \text{(5)}$$

where, $n_{11}$ is a refractive index of the first lens element to the d-line, $n_{12}$ is a refractive index of the second lens element to the d-line, $r_{12}$ is a radius of curvature of the image side surface of the first lens element, $r_{21}$ is a radius of curvature of the object side surface of the second lens element, d is an optical axial distance between the image side surface of the first lens element and the object side surface of the second lens element, and $f_W$ is a focal length of the entire system at a wide-angle limit.

The condition (5) is to be satisfied by the first lens element and the second lens element in the first lens unit. When the value exceeds the upper limit of the condition (5), the thickness along the optical axis of the first lens unit increases, and hence difficulty arises in reduction of the overall length at the time of retraction. Thus, this situation is not preferable. Further, when the value exceeds the upper limit of the condition (5), compensation of various kinds of aberration on the off-axial ray, especially, astigmatism and distortion at a wide-angle limit, becomes insufficient. Thus, this situation is not preferable. In contrast, when the value goes below the lower limit of the condition (5), similarly, compensation of various kinds of aberration on the off-axial ray, especially, astigmatism and distortion at a wide-angle limit, becomes difficult. Thus, this situation is not preferable.

Here, when at least one of the following conditions (5)' and (5)" is satisfied, the above-mentioned effect is achieved more successfully.

$$0.15 < (n_{11}-1) \cdot (n_{12}-1) \cdot d \cdot f_W / (r_{12} \cdot r_{21}) \quad (5)'$$

$$(n_{11}-1) \cdot (n_{12}-1) \cdot d \cdot f_W / (r_{12} \cdot r_{21}) < 0.25 \quad (5)''$$

In a zoom lens system having the above-mentioned basic configuration like each zoom lens system according to Embodiments I-1 to I-2, II-1 to II-2 and III-1 to III-2, it is preferable that the following condition (6) is satisfied.

$$0.0001 < (n_{11}-1) \cdot (n_{12}-1) \cdot d^2 \cdot f_W / (r_{12} \cdot r_{21} \cdot f_t) < 0.04 \quad (6)$$

where, $n_{11}$ is a refractive index of the first lens element to the d-line, $n_{12}$ is a refractive index of the second lens element to the d-line, $r_{12}$ is a radius of curvature of the image side surface of the first lens element, $r_{21}$ is a radius of curvature of the object side surface of the second lens element, d is an optical axial distance between the image side surface of the first lens element and the object side surface of the second lens element, $f_T$ is a focal length of the entire system at a telephoto limit, and $f_W$ is a focal length of the entire system at a wide-angle limit.

The condition (6) is to be satisfied by the first lens element and the second lens element in the first lens unit. When the value exceeds the upper limit of the condition (6), the thickness along the optical axis of the first lens unit increases, and hence difficulty arises in reduction of the overall length at the time of retraction. Thus, this situation is not preferable. Further, when the value exceeds the upper limit of the condition (6), compensation of various kinds of aberration on the off-axial ray, especially, astigmatism and distortion at a wide-angle limit, becomes insufficient. Thus, this situation is not preferable. In contrast, when the value goes below the lower limit of the condition (6), similarly, compensation of various kinds of aberration on the off-axial ray, especially, astigmatism and distortion at a wide-angle limit, becomes difficult. Thus, this situation is not preferable.

In a zoom lens system having the above-mentioned basic configuration like each zoom lens system according to Embodiments I-1 to I-2, II-1 to II-2 and III-1 to III-2, it is preferable that the following condition (9) is satisfied.

$$2.4 < |f_{G1}|/f_W < 4.0 \quad (9)$$

where, $f_{G1}$ is a composite focal length of the first lens unit, and $f_W$ is a focal length of the entire system at a wide-angle limit.

The condition (9) sets forth the focal length of the first lens unit. When the value exceeds the upper limit of the condition (9), the optical power of the first lens unit becomes excessively weak. Thus, compensation of various kinds of aberration on the off-axial ray, especially, astigmatism and distortion at a wide-angle limit, becomes insufficient. Further, the effective diameter of the first lens unit need be increased. Thus, size reduction becomes difficult especially in a direction perpendicular to the optical axis. Accordingly, this situation is not preferable. In contrast, when the value goes below the lower limit of the condition (9), the optical power of the first lens unit becomes excessively strong, and hence decentering error sensitivity between the first lens element and the second lens element in the first lens unit becomes high. As a result, performance degradation caused by decentering increases, so that fabrication becomes difficult. Thus, this situation is not preferable. Further, when the value goes below the lower limit of the condition (9), magnification chromatic aberration generated in the first lens unit becomes excessively large. Thus, this situation is not preferable.

When the following condition (9)' is satisfied, the above-mentioned effect is achieved more successfully.

$$|f_{G1}|/f_W < 3.0 \quad (9)'$$

In a zoom lens system having the above-mentioned basic configuration like each zoom lens system according to Embodiments I-1 to I-2, II-1 to II-2 and III-1 to III-2, it is preferable that the following condition (10) is satisfied.

$$1.85 < f_{G2}/f_W < 3.0 \quad (10)$$

where, $f_{G2}$ is a composite focal length of the second lens unit, and $f_W$ is a focal length of the entire system at a wide-angle limit.

The condition (10) sets forth the focal length of the second lens unit. When the value exceeds the upper limit of the condition (10), the amount of movement of the second lens unit during the zooming need be excessively large. Thus, size reduction of the zoom lens system becomes difficult. Accordingly, this situation is not preferable. In contrast, when the value goes below the lower limit of the condition (10), the focal length of the second lens unit becomes excessively short. This causes difficulty in aberration compensation for the entire variable magnification range. Thus, this situation is not preferable.

Here, when any one of the following conditions (10)' and (10)" is further satisfied, the above-mentioned effect is achieved more successfully.

$$1.9 < f_{G2}/f_W \quad (10)'$$

$$1.95 < f_{G2}/f_W \quad (10)''$$

In a zoom lens system having the above-mentioned basic configuration like each zoom lens system according to Embodiments I-1 to I-2, II-1 to II-2 and III-1 to III-2, it is preferable that the following condition (11) is satisfied.

$$2.5 < f_{G3}/f_W < 6.0 \quad (11)$$

where, $f_{G3}$ is a composite focal length of the third lens unit, and $f_W$ is a focal length of the entire system at a wide-angle limit.

The condition (11) sets forth the focal length of the third lens unit. When the value exceeds the upper limit of the condition (11), the optical power of the third lens unit is reduced, and hence the amount of movement of the third lens unit increases. Thus, size reduction of the optical system becomes difficult. Accordingly, this situation is not preferable. In contrast, when the value goes below the lower limit of the condition (11), the optical power of the third lens unit increases. This causes difficulty in compensation of spherical aberration and coma aberration in a variable magnification range where the third lens unit goes comparatively close to the object side. Thus, this situation is not preferable.

Here, when any one of the following conditions (11)' and (11)" is further satisfied, the above-mentioned effect is achieved more successfully.

$$3.0 < f_{G3}/f_W \quad (11)'$$

$$4.0 < f_{G3}/f_W \quad (11)''$$

In a zoom lens system having the above-mentioned basic configuration like each zoom lens system according to Embodiments I-1 to I-2, II-1 to II-2 and III-1 to III-2, it is preferable that the following condition (12) is satisfied.

$$1.0 < |f_{L1}|/f_W < 2.5 \quad (12)$$

where, $f_{L1}$ is a focal length of the first lens element, and $f_W$ is a focal length of the entire system at a wide-angle limit.

The condition (12) sets forth the focal length of the first lens element. When the value exceeds the upper limit of the condition (12), compensation of various kinds of aberration on the off-axial ray, especially, astigmatism and distortion at a wide-angle limit, becomes insufficient. Thus, this situation is not preferable. In contrast, when the value goes below the lower limit of the condition (12), the positive optical power of the second lens element that constitutes the first lens unit need be increased, and hence difficulty arises in compensation of aberration generated in the first lens unit. Thus, this situation is not preferable.

Here, when at least one of the following conditions (12)' and (12)" is satisfied, the above-mentioned effect is achieved more successfully.

$$1.1 < |f_{L1}|/f_W \quad (12)'$$

$$|f_{L1}|/f_W < 1.6 \quad (12)''$$

In a zoom lens system having the above-mentioned basic configuration like each zoom lens system according to Embodiments I-1 to I-2, II-1 to II-2 and III-1 to III-2, it is preferable that the following condition (13) is satisfied.

$$2.0 < f_{L2}/f_W < 5.0 \quad (13)$$

where, $f_{L2}$ is a focal length of the second lens element, and $f_W$ is a focal length of the entire system at a wide-angle limit.

The condition (13) sets forth the focal length of the second lens element. When the value exceeds the upper limit of the condition (13), the Petzval sum increases excessively, and hence the curvature of field increases. Further, astigmatism also increases excessively. Thus, this situation is not preferable. In contrast, when the value goes below the lower limit of the condition (13), the negative optical power of the first entire lens unit becomes weak, and hence difficulty arises in achieving the size reduction of the zoom lens system. Thus, this situation is not preferable.

Here, when at least one of the following conditions (13)' and (13)" is satisfied, the above-mentioned effect is achieved more successfully.

$$2.4 < f_{L2}/f_W \quad (13)'$$

$$f_{L2}/f_W < 4.0 \quad (13)''$$

In a zoom lens system having the above-mentioned basic configuration like each zoom lens system according to Embodiments I-1 to I-2, II-1 to II-2 and III-1 to III-2, it is preferable that the following condition (14) is satisfied.

$$0.4 < |f_{L1}|/|f_{G1}| < 0.8 \quad (14)$$

where, $f_{L1}$ is a focal length of the first lens element, and $f_{G1}$ is a composite focal length of the first lens unit.

The condition (14) sets forth the focal length of the first lens element. When the value exceeds the upper limit of the condition (14), compensation of various kinds of aberration on the off-axial ray, especially, astigmatism and distortion at a wide-angle limit, becomes insufficient. Thus, this situation is not preferable. In contrast, when the value goes below the lower limit of the condition (14), the positive optical power of the second lens element that constitutes the first lens unit need be increased, and hence difficulty arises in compensation of aberration generated in the first lens unit. Thus, this situation is not preferable.

Here, when any one of the following conditions (14)' and (14)" is further satisfied, the above-mentioned effect is achieved more successfully.

$$0.45 < |f_{L1}|/|f_{G1}| \quad (14)'$$

$$0.55 < |f_{L1}|/|f_{G1}| \quad (14)''$$

In a zoom lens system having the above-mentioned basic configuration like each zoom lens system according to Embodiments I-1 to I-2, II-1 to II-2 and III-1 to III-2, it is preferable that the following condition (15) is satisfied.

$$0.85 < f_{L2}/|f_{G1}| < 2.0 \quad (15)$$

where, $f_{L2}$ is a focal length of the second lens element, and $f_{G1}$ is a composite focal length of the first lens unit.

The condition (15) sets forth the focal length of the second lens element. When the value exceeds the upper limit of the condition (15), the Petzval sum increases excessively, and hence the curvature of field increases. Further, astigmatism also increases excessively. Thus, this situation is not preferable. In contrast, when the value goes below the lower limit of the condition (15), the negative optical power of the first entire lens unit becomes weak, and hence difficulty arises in achieving the size reduction of the zoom lens system. Thus, this situation is not preferable.

When the following condition (15)' is satisfied, the above-mentioned effect is achieved more successfully.

$$f_{L2}/|f_{G1}| < 1.8 \quad (15)'$$

In a zoom lens system having the above-mentioned basic configuration like each zoom lens system according to Embodiments I-1 to I-2, II-1 to II-2 and III-1 to III-2, it is preferable that the following condition (16) is satisfied.

$$1.9 < f_{L2}/|f_{L1}| < 3.0 \quad (16)$$

where, $f_{L1}$ is a focal length of the first lens element, and
$f_{L2}$ is a focal length of the second lens element.

The condition (16) sets forth the ratio between the focal lengths of the first lens element and the second lens element. When the value exceeds the upper limit of the condition (16), the optical power balance becomes unsatisfactory between the first lens element and the second lens element, and hence curvature of field and distortion increase. Thus, this situation is not preferable. In contrast, when the value goes below the lower limit of the condition (16), similarly, the optical power balance becomes unsatisfactory between the first lens element and the second lens element, and hence distortion occurs. At the same time, the effective diameter of the first lens element need be increased. Thus, size reduction becomes difficult especially in a direction perpendicular to the optical axis. Thus, this situation is not preferable.

When the following condition (16)' is satisfied, the above-mentioned effect is achieved more successfully.

$$2.0 < f_{L2}/|f_{L1}| \quad (16)'$$

Here, the lens units constituting the zoom lens system of each embodiment are composed exclusively of refractive type lenses that deflect the incident light by refraction (that is, lenses of a type in which deflection is achieved at the interface between media each having a distinct refractive index). However, the lens type is not limited to this. For example, the lens units may employ diffractive type lenses that deflect the incident light by diffraction; refractive-diffractive hybrid type lenses that deflect the incident light by a combination of diffraction and refraction; or gradient index type lenses that deflect the incident light by distribution of refractive index in the medium.

Further, in each embodiment, a reflecting surface may be arranged in the optical path so that the optical path may be bent before, after or in the middle of the zoom lens system. The bending position may be set up in accordance with the necessity. When the optical path is bent appropriately, the apparent thickness of a camera can be reduced.

Moreover, each embodiment has been described for the case that a parallel plate such as an optical low-pass filter is arranged between the last surface of the zoom lens system (the most image side surface of the third lens unit) and the image surface S. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiments I-3, II-3 and III-3

Figure 7:
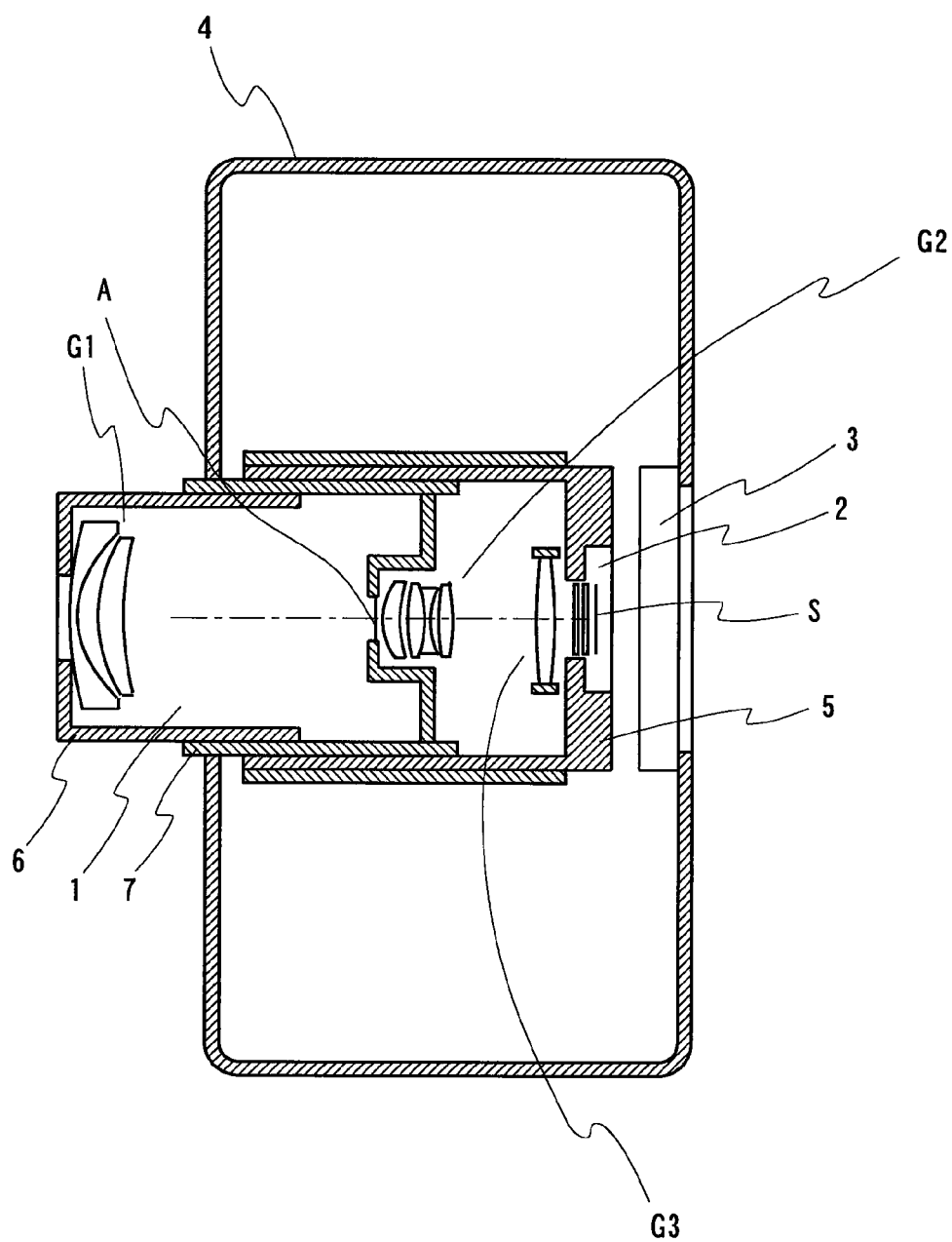
FIG. 7 is a schematic configuration diagram of a digital still camera according to Embodiments I-3, II-3 and III-3.

FIG. 7 is a schematic construction diagram of a digital still camera according to Embodiments I-3, II-3 and III-3. In FIG. 7, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment I-1, II-1 or III-1. In FIG. 7, the zoom lens system 1 comprises a first lens unit G1, a diaphragm A, a second lens unit G2 and a third lens unit G3. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

A lens barrel comprises a main barrel 5, a moving barrel 6 and a cylindrical cam 7. When the cylindrical cam 7 is rotated, the first lens unit G1, the second lens unit G2 and the third lens unit G3 move to predetermined positions relative to the image sensor 2, so that magnification change can be achieved ranging from a wide-angle limit to a telephoto limit. The third lens unit G3 is movable in an optical axis direction by a motor for focus adjustment.

As such, when a zoom lens system according to Embodiment I-1, II-1 or III-1 is employed in a digital still camera, a small digital still camera is obtained that has a high resolution and high capability of compensating the curvature of field and that has a short overall optical length at the time of non-use. Here, in place of the zoom lens system according to Embodiment I-1, II-1 or III-1, the digital still camera shown in FIG. 7 may employ any one of the zoom lens systems according to Embodiments I-2, II-2 and III-2. Further, the optical system of the digital still camera shown in FIG. 7 is applicable also to a digital video camera for moving images. In this case, moving images with high resolution can be acquired in addition to still images.

Further, the above-mentioned zoom lens system according to Embodiments I-1 to I-2, II-1 to II-2 and III-1 to III-2 and an image sensor such as a CCD or a CMOS may be applied to a mobile telephone, a PDA (Personal Digital Assistance), a surveillance camera in a surveillance system, a Web camera, a vehicle-mounted camera or the like.

Numerical examples are described below in which the zoom lens systems according to Embodiments I-1 to I-2, II-1 to II-2 and III-1 to III-2 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1 - (1+k)(h/r)^2}} + A4h^4 + A6h^6 + A8h^8 + A10h^{10} + A12h^{12} + A14h^{14}$$

Here, κ is the conic constant. A4, A6, A8, A10, A12 and A14 are fourth, sixth, eighth, tenth, twelfth, fourteenth aspherical coefficients, respectively.

Figure 2:
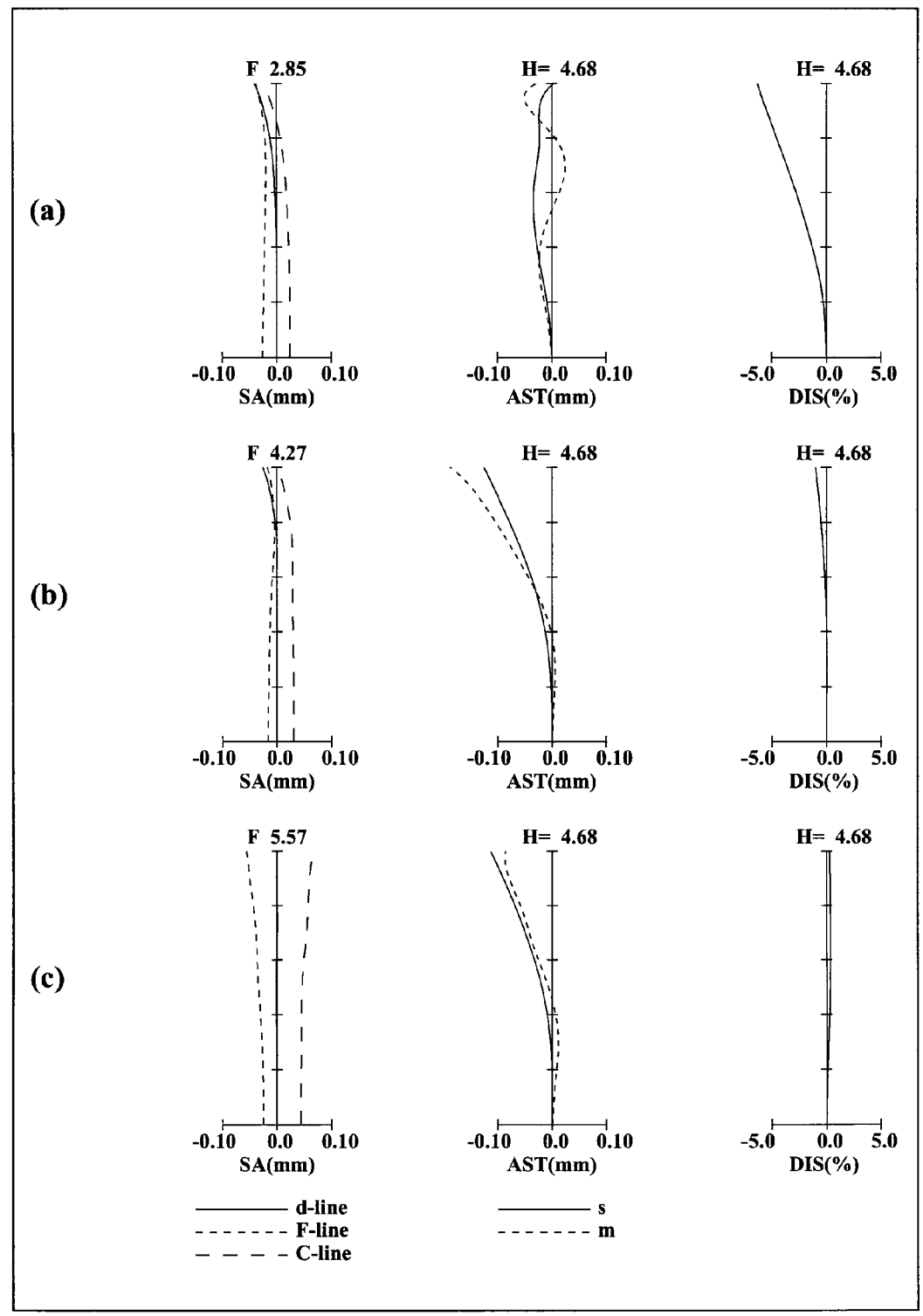
FIGS. 2a-2c are longitudinal aberration diagrams showing an infinity in-focus condition of a zoom lens system according to Examples I-1, II-1 and III-1.
Figure 5:
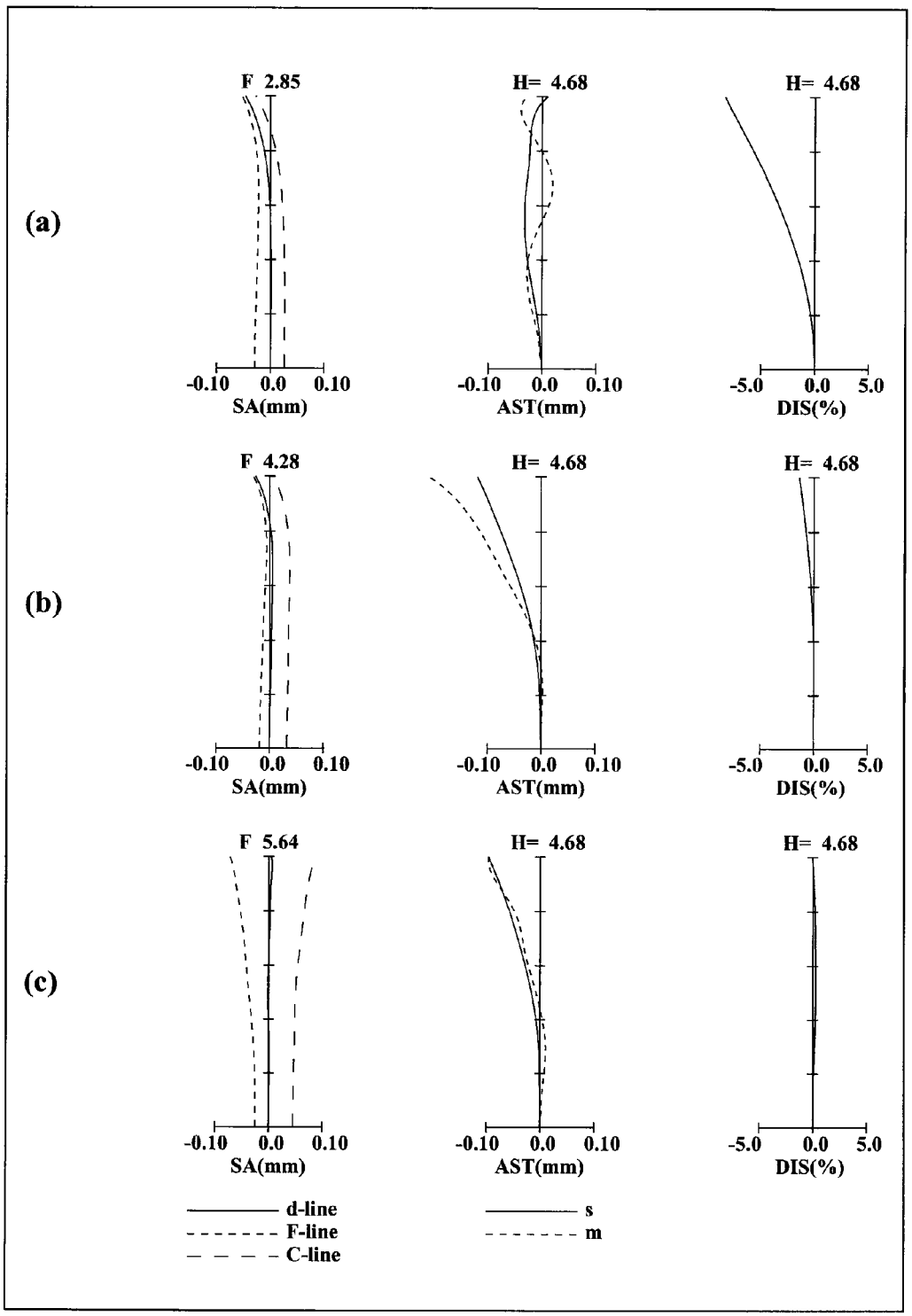
FIGS. 5a-5c are longitudinal aberration diagrams showing an infinity in-focus condition of a zoom lens system according to Examples I-2, II-2 and III-2.

FIG. 2 is a longitudinal aberration diagram of a zoom lens system according to Examples I-1, II-1 and III-1. FIG. 5 is a longitudinal aberration diagram of a zoom lens system according to Examples I-2, II-2 and III-2.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In the spherical aberration diagram, the vertical axis indicates the F-number (indicated as "F" in the figure), the solid line indicates the characteristics to the d-line, the short dashed line indicates the characteristics to the F-line, and the long dashed line indicates the characteristics to the C-line. In the astigmatism diagram, the vertical axis indicates the image height (indicated as "H" in the figure), and the solid line and the dashed line indicate the characteristics to the sagittal image plane (indicated as "s" in the figure) and the meridional image plane (indicated as "m" in the figure), respectively. In the distortion diagram, the vertical axis indicates the image height (indicated as "H" in the figure).

Figure 3:
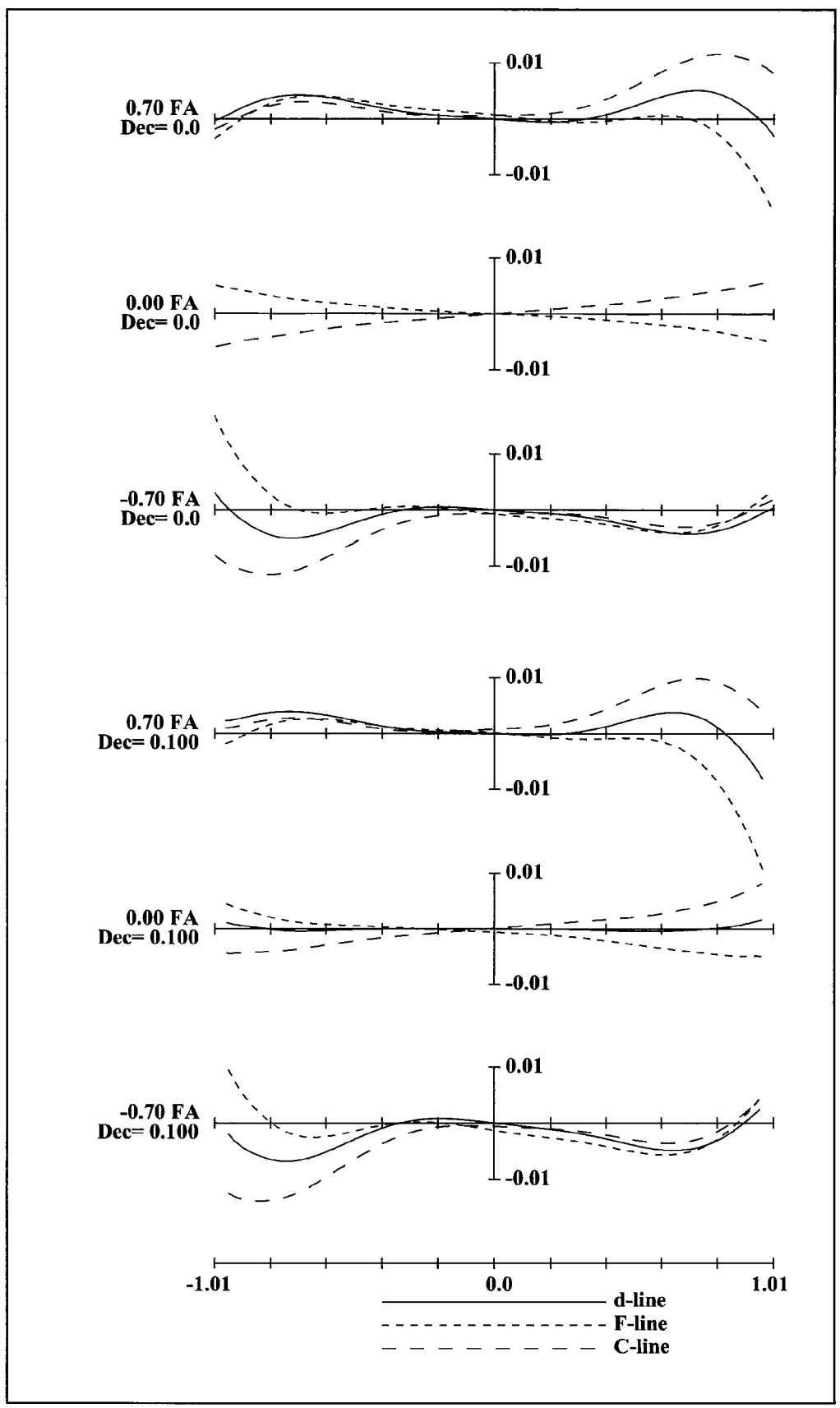
FIG. 3 is a lateral aberration diagram in a basic state where image blur compensation is not performed and in an image blur compensation state at a telephoto limit of a zoom lens system according to Examples I-1, II-1 and III-1.
Figure 6:
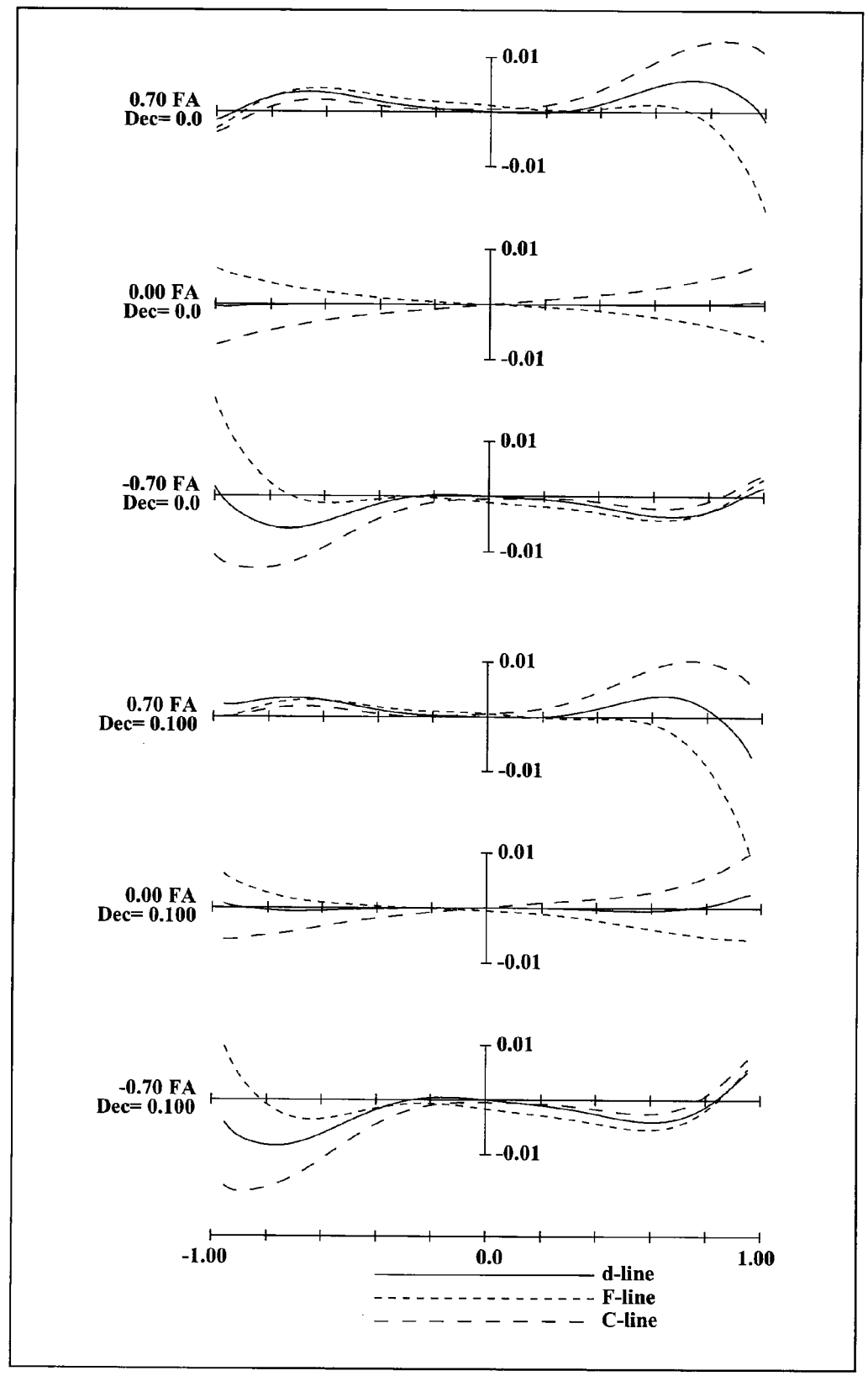
FIG. 6 is a lateral aberration diagram in a basic state where image blur compensation is not performed and in an image blur compensation state at a telephoto limit of a zoom lens system according to Examples I-2, II-2 and III-2.

Further, FIG. 3 is a lateral aberration diagram of a zoom lens system according to Examples I-1, II-1 and III-1 at a telephoto limit. FIG. 6 is a lateral aberration diagram of a zoom lens system according to Examples I-2, II-2 and III-2 at a telephoto limit.

In each lateral aberration diagram, the three upper aberration diagrams correspond to a basic state where image blur compensation is not performed at a telephoto limit, while the three lower aberration diagrams correspond to an image blur compensation state where the entire second lens unit G2 is moved with a predetermined amount in a direction perpendicular to the optical axis at a telephoto limit. Among the lateral aberration diagrams of the basic state, the upper one shows lateral aberration at an image point of 70% of the maximum image height, the middle one shows lateral aberration at the axial image point, and the lower one shows lateral aberration at an image point of −70% of the maximum image height. Among the lateral aberration diagrams of the image blur compensation state, the upper one shows lateral aberration at an image point of 70% of the maximum image height, the middle one shows lateral aberration at the axial image point, and the lower one shows lateral aberration at an image point of −70% of the maximum image height. In each lateral aberration diagram, the horizontal axis indicates the distance from the principal ray on the pupil surface. The solid line indicates the characteristics to the d-line, the short dashed line indicates the characteristics to the F-line, and the long dashed line indicates the characteristics to the C-line. In each lateral aberration diagram, the meridional image plane is adopted as the plane containing the optical axis of the first lens unit G1 and the optical axis of the second lens unit G2.

Here, the amount of movement of the second lens unit G2 in a direction perpendicular to the optical axis in the image blur compensation state at a telephoto limit is as follows.

Examples I-1, II-1 and III-1: 0.100 mm
Examples I-2, II-2 and III-2: 0.100 mm

Here, when the shooting distance is infinity, at a telephoto limit, the amount of image decentering in a case that the zoom lens system inclines by 0.6° is equal to the amount of image decentering in a case that the entire second lens unit G2 moves in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel movement required for image blur compensation decreases with decreasing focal length of the entire zoom lens system. Thus, at arbitrary zoom positions, sufficient image blur compensation can be performed for image blur compensation angles up to 0.6° without degrading the imaging characteristics.

Numerical Examples I-1, II-1 and III-1

The zoom lens systems of Numerical Examples I-1, II-1 and III-1 correspond respectively to Embodiments I-1, II-1 and III-1 shown in FIG. 1. Table 1 shows the surface data of the zoom lens systems of Numerical Examples I-1, II-1 and III-1. Table 2 shows the aspherical data. Table 3 shows various data.

TABLE 1

(Surface data)

| Surface number | r | d | nd | vd |
|---|---|---|---|---|
| Object surface | ∞ | ∞ | | |
| 1 | 51.08500 | 1.10000 | 1.90001 | 34.5 |
| 2* | 6.68800 | 2.30000 | | |
| 3* | 12.12200 | 1.75000 | 2.14001 | 17.0 |
| 4 | 21.50000 | Variable | | |
| 5 (Diaphragm) | ∞ | 0.35000 | | |
| 6* | 5.70000 | 1.58700 | 1.80470 | 41.0 |
| 7 | 29.04600 | 0.37500 | | |
| 8 | 38.03700 | 1.04600 | 1.72916 | 54.7 |
| 9 | −16.50000 | 0.63000 | 1.76182 | 26.6 |
| 10 | 5.49100 | 0.70000 | | |
| 11* | 17.68100 | 1.10000 | 1.66547 | 55.2 |
| 12 | −20.90300 | Variable | | |
| 13* | 33.43600 | 1.60000 | 1.66547 | 55.2 |
| 14* | −49.83400 | Variable | | |
| 15 | ∞ | 0.28000 | 1.51680 | 64.2 |
| 16 | ∞ | 0.50000 | | |
| 17 | ∞ | 0.50000 | 1.51680 | 64.2 |
| 18 | ∞ | 0.37000 | | |
| 19 | ∞ | 0.29815 | | |
| Image surface | ∞ | | | |

TABLE 2

(Aspherical data)

Surface No. 2

K = −1.56675E+00, A4 = 4.70570E−04, A6 = 4.66416E−06,
A8 = −9.97845E−07, A10 = 4.97712E−08, A12 = −1.08769E−09,
A14 = 8.99770E−12

Surface No. 3

K = 0.00000E+00, A4 = 4.87626E−05, A6 = 2.01434E−06,
A8 = −5.22735E−07, A10 = 2.72826E−08, A12 = −6.10198E−10,
A14 = 5.12805E−12

Surface No. 6

K = 0.00000E+00, A4 = −2.23822E−04, A6 = 7.67079E−06,
A8 = −2.43773E−06, A10 = 4.29726E−07, A12 = −3.98936E−08,
A14 = 1.56912E−09

Surface No. 11

K = 0.00000E+00, A4 = −4.37904E−04, A6 = −5.27665E−05,
A8 = 4.76568E−06, A10 = −6.52195E−07, A12 = 0.00000E+00,
A14 = 0.00000E+00

Surface No. 13

K = 0.00000E+00, A4 = −1.10340E−04, A6 = 1.04396E−05,
A8 = −6.20441E−07, A10 = 1.92500E−08, A12 = −2.48363E−10,
A14 = 0.00000E+00

Surface No. 14

K = 0.00000E+00, A4 = 5.28184E−06, A6 = 1.04655E−07,
A8 = −1.48869E−08, A10 = 0.00000E+00, A12 = 0.00000E+00,
A14 = 0.00000E+00

TABLE 3

(Various data)

Zooming ratio  3.28506

|  | Wide-angle limit | Middle position | Telephoto limit |
|---|---|---|---|
| Focal length | 6.2096 | 13.2985 | 20.3990 |
| F-number | 2.85034 | 4.26999 | 5.57319 |
| View angle | 38.7767 | 19.5485 | 12.8788 |
| Image height | 4.6750 | 4.6750 | 4.6750 |
| Overall length of lens system | 40.4589 | 37.1496 | 40.0163 |
| BF | 0.09365 | −0.50369 | 0.29815 |
| d4 | 16.6839 | 5.4283 | 1.5000 |
| d12 | 3.5123 | 13.7570 | 21.2901 |
| d14 | 5.9810 | 4.2800 | 2.7400 |
| Entrance pupil position | 8.6898 | 5.6601 | 3.8417 |
| Exit pupil position | −18.6236 | −51.4459 | −172.8086 |
| Front principal points position | 12.8393 | 15.4870 | 21.8369 |
| Back principal points position | 34.2492 | 23.8511 | 19.6172 |

Single lens data

| Lens element | Initial surface number | Focal length |
|---|---|---|
| 1 | 1 | −8.6520 |
| 2 | 3 | 22.1735 |
| 3 | 6 | 8.5536 |
| 4 | 8 | 15.9112 |
| 5 | 9 | −5.3419 |
| 6 | 11 | 14.5598 |
| 7 | 13 | 30.3019 |
| 8 | 15 | ∞ |
| 9 | 17 | ∞ |

Zoom lens unit data

| Lens unit | Initial surface No. | Focal length | Overall length of lens unit | Front principal points position | Back principal points position |
|---|---|---|---|---|---|
| 1 | 1 | −15.63371 | 5.15000 | −0.20747 | 1.18551 |
| 2 | 5 | 12.54975 | 5.78800 | −0.51799 | 1.29535 |
| 3 | 13 | 30.30192 | 1.60000 | 0.38874 | 1.02061 |

Numerical Examples I-2, II-2 and III-2

The zoom lens systems of Numerical Examples I-2, II-2 and III-2 correspond respectively to Embodiments I-2, II-2 and III-2 shown in FIG. 4. Table 4 shows the surface data of the zoom lens systems of Numerical Examples I-2, II-2 and III-2. Table 5 shows the aspherical data. Table 6 shows various data.

TABLE 4

(Surface data)

| Surface number | r | d | nd | vd |
|---|---|---|---|---|
| Object surface | ∞ | ∞ | | |
| 1 | 62.16200 | 1.10000 | 1.90001 | 34.5 |
| 2* | 6.69200 | 2.30000 | | |
| 3* | 12.07300 | 1.75000 | 2.14001 | 17.0 |
| 4 | 21.50000 | Variable | | |
| 5 (Diaphragm) | ∞ | 0.35000 | | |
| 6* | 5.69200 | 1.58700 | 1.80470 | 41.0 |
| 7 | 32.03800 | 0.37500 | | |
| 8 | 29.47800 | 1.04600 | 1.72916 | 54.7 |
| 9 | −16.01700 | 0.63000 | 1.76182 | 26.6 |
| 10 | 5.39900 | 0.70000 | | |
| 11* | 18.61200 | 1.10000 | 1.66547 | 55.2 |
| 12 | −23.48300 | Variable | | |
| 13* | 36.78300 | 1.60000 | 1.66547 | 55.2 |
| 14* | −48.34000 | Variable | | |
| 15 | ∞ | 0.28000 | 1.51680 | 64.2 |
| 16 | ∞ | 0.50000 | | |
| 17 | ∞ | 0.50000 | 1.51680 | 64.2 |
| 18 | ∞ | 0.37000 | | |
| 19 | ∞ | 0.28717 | | |
| Image surface | ∞ | | | |

TABLE 5

(Aspherical data)

Surface No. 2

$K = -1.56154E+00, A4 = 4.68480E-04, A6 = 4.15258E-06,$
$A8 = -1.01913E-06, A10 = 5.05982E-08, A12 = -1.06364E-09,$
$A14 = 8.20851E-12$

Surface No. 3

$K = 0.00000E+00, A4 = 5.16820E-05, A6 = 1.33836E-06,$
$A8 = -5.23000E-07, A10 = 2.76838E-08, A12 = -5.97362E-10,$
$A14 = 4.65996E-12$

Surface No. 6

$K = 0.00000E+00, A4 = -2.38112E-04, A6 = 7.51411E-06,$
$A8 = -2.40483E-06, A10 = 4.29616E-07, A12 = -4.01119E-08,$
$A14 = 1.60238E-09$

Surface No. 11

$K = 0.00000E+00, A4 = -5.17367E-04, A6 = -5.66448E-05,$
$A8 = 4.53807E-06, A10 = -7.50402E-07, A12 = 0.00000E+00,$
$A14 = 0.00000E+00$

Surface No. 13

$K = 0.00000E+00, A4 = -6.25328E-05, A6 = 9.00851E-06,$
$A8 = -7.82678E-07, A10 = 2.97351E-08, A12 = -4.15223E-10,$
$A14 = 0.00000E+00$

Surface No. 14

$K = 0.00000E+00, A4 = 6.42897E-05, A6 = -4.19023E-06,$
$A8 = 6.58934E-08, A10 = 0.00000E+00, A12 = 0.00000E+00,$
$A14 = 0.00000E+00$

TABLE 6

(Various data)

Zooming ratio  3.28135

|  | Wide-angle limit | Middle position | Telephoto limit |
|---|---|---|---|
| Focal length | 6.2142 | 13.1141 | 20.3911 |
| F-number | 2.85258 | 4.28066 | 5.64291 |
| View angle | 39.3679 | 19.8675 | 12.9178 |
| Image height | 4.6750 | 4.6750 | 4.6750 |
| Overall length of lens system | 39.3161 | 36.6808 | 39.7421 |
| BF | 0.25556 | −0.59241 | 0.28717 |
| d4 | 15.8504 | 5.4283 | 1.5000 |
| d12 | 3.0411 | 13.3769 | 21.0269 |
| d14 | 5.9810 | 4.2800 | 2.7400 |
| Entrance pupil position | 8.3349 | 5.5693 | 3.7979 |

TABLE 6-continued (Various data)

| | | | |
|---|---|---|---|
| Exit pupil position | −17.5453 | −46.5039 | −132.8723 |
| Front principal points position | 12.3797 | 14.9375 | 21.0664 |
| Back principal points position | 33.1018 | 23.5667 | 19.3510 |

Single lens data

| Lens element | Initial surface number | Focal length |
|---|---|---|
| 1 | 1 | −8.4115 |
| 2 | 3 | 21.9794 |
| 3 | 6 | 8.3767 |
| 4 | 8 | 14.3722 |
| 5 | 9 | −5.2338 |
| 6 | 11 | 15.7669 |
| 7 | 13 | 31.6266 |
| 8 | 15 | ∞ |
| 9 | 17 | ∞ |

Zoom lens unit data

| Lens unit | Initial surface No. | Focal length | Overall length of lens unit | Front principal points position | Back principal points position |
|---|---|---|---|---|---|
| 1 | 1 | −15.04135 | 5.15000 | −0.21859 | 1.17026 |
| 2 | 5 | 12.23158 | 5.78800 | −0.68230 | 1.21868 |
| 3 | 13 | 31.62659 | 1.60000 | 0.41827 | 1.05031 |

Table I-7 shows values corresponding to the individual conditions in the zoom lens system of Numerical Examples I-1 to I-2. Table II-7 shows values corresponding to the individual conditions in the zoom lens system of Numerical Examples II-1 to II-2. Table III-7 shows values corresponding to the individual conditions in the zoom lens system of Numerical Examples III-1 to III-2.

TABLE I-7

(Values corresponding to conditions)

| | Condition | Numerical Example I-1 | Numerical Example I-2 |
|---|---|---|---|
| (1) | $\alpha i_W$ | 11.82 | 12.45 |
| (I-2) | $n_{11}$ | 1.90001 | 1.90001 |
| (I-3) | $(n_{11} - 1)^2$ | 0.810 | 0.810 |
| (I-4) | $(n_{11} - 1) \cdot f_W/r_{12}$ | 0.836 | 0.836 |
| (5) | $(n_{11} - 1) \cdot (n_{12} - 1) \cdot d \cdot f_W/(r_{12} \cdot r_{21})$ | 0.181 | 0.182 |
| (6) | $(n_{11} - 1) \cdot (n_{12} - 1) \cdot d^2 \cdot f_w/(r_{12} \cdot r_{21} \cdot f_T)$ | 0.020 | 0.020 |
| (9) | $|f_{G1}|/f_W$ | 2.518 | 2.420 |
| (10) | $f_{G2}/f_W$ | 2.021 | 1.968 |
| (11) | $f_{G3}/f_W$ | 4.880 | 5.089 |
| (12) | $|f_{L1}|/f_W$ | 1.393 | 1.354 |
| (13) | $f_{L2}/f_W$ | 3.571 | 3.537 |
| (14) | $|f_{L1}|/|f_{G1}|$ | 0.553 | 0.559 |
| (15) | $f_{L2}/|f_{G1}|$ | 1.418 | 1.461 |
| (16) | $f_{L2}/|f_{L1}|$ | 2.563 | 2.613 |

TABLE II-7

(Values corresponding to conditions)

| | Condition | Numerical Example II-1 | Numerical Example II-2 |
|---|---|---|---|
| (1) | $\alpha i_W$ | 11.82 | 12.45 |
| (II-2) | $(n_{11} - 1) \cdot (n_{12} - 1)$ | 1.026 | 1.026 |
| (5) | $(n_{11} - 1) \cdot (n_{12} - 1) \cdot d \cdot f_W/(r_{12} \cdot r_{21})$ | 0.181 | 0.182 |
| (6) | $(n_{11} - 1) \cdot (n_{12} - 1) \cdot d^2 \cdot f_w/(r_{12} \cdot r_{21} \cdot f_T)$ | 0.020 | 0.020 |
| (9) | $|f_{G1}|/f_W$ | 2.518 | 2.420 |
| (10) | $f_{G2}/f_W$ | 2.021 | 1.968 |
| (11) | $f_{G3}/f_W$ | 4.880 | 5.089 |
| (12) | $|f_{L1}|/f_W$ | 1.393 | 1.354 |
| (13) | $f_{L2}/f_W$ | 3.571 | 3.537 |
| (14) | $|f_{L1}|/|f_{G1}|$ | 0.553 | 0.559 |
| (15) | $f_{L2}/|f_{G1}|$ | 1.418 | 1.461 |
| (16) | $f_{L2}/|f_{L1}|$ | 2.563 | 2.613 |

TABLE III-7

(Values corresponding to conditions)

| | Condition | Numerical Example III-1 | Numerical Example III-2 |
|---|---|---|---|
| (1) | $\alpha i_W$ | 11.82 | 12.45 |
| (III-2) | $n_{12}$ | 2.14001 | 2.14001 |
| (III-3) | $(n_{12} - 1)^2$ | 1.300 | 1.300 |
| (III-4) | $(n_{12} - 1) \cdot f_W/r_{21}$ | 0.584 | 0.587 |
| (5) | $(n_{11} - 1) \cdot (n_{12} - 1) \cdot d \cdot f_W/(r_{12} \cdot r_{21})$ | 0.181 | 0.182 |
| (6) | $(n_{11} - 1) \cdot (n_{12} - 1) \cdot d^2 \cdot f_w/(r_{12} \cdot r_{21} \cdot f_T)$ | 0.020 | 0.020 |
| (9) | $|f_{G1}|/f_W$ | 2.518 | 2.420 |
| (10) | $f_{G2}/f_W$ | 2.021 | 1.968 |
| (11) | $f_{G3}/f_W$ | 4.880 | 5.089 |
| (12) | $|f_{L1}|/f_W$ | 1.393 | 1.354 |
| (13) | $f_{L2}/f_W$ | 3.571 | 3.537 |
| (14) | $|f_{L1}|/|f_{G1}|$ | 0.553 | 0.559 |
| (15) | $f_{L2}/|f_{G1}|$ | 1.418 | 1.461 |
| (16) | $f_{L2}/|f_{L1}|$ | 2.563 | 2.613 |

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the present zoom lens system is suitable for an imaging optical system in a digital still camera, a digital video camera or the like that requires high image quality.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A zoom lens system, in order from the object side to the image side, comprising a first lens unit having negative optical power, a second lens unit having positive optical power and a third lens unit having positive optical power, wherein
the first lens unit, in order from the object side to the image side, consists of a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1), (I-2) and (5) are satisfied:

$$5.0 < \alpha i_W < 20.0 \quad (1)$$

$$n_{11} \geq 1.9 \quad (I\text{-}2)$$

$$0.1 < (n_{11}-1) \cdot (n_{12}-1) \cdot d \cdot f_W / (r_{12} \cdot r_{21}) < 0.3 \quad (5)$$

(wherein, $3.2 < f_T/f_W$ and $\omega_W > 35$)
where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{11}$ is a refractive index of the first lens element to the d-line, $n_{12}$ is a refractive index of the second lens element to the d-line, $r_{12}$ is a radius of curvature of the image side surface of the first lens element, $r_{21}$ is a radius of curvature of the object side surface of the second lens element, d is an optical axial distance between the image side surface of the first lens element and the object side surface of the second lens element, $\omega_W$ is a half view angle (°) at a wide-angle limit, $f_T$ is a focal length of the entire system at a telephoto limit, and $f_W$ is a focal length of the entire system at a wide-angle limit.

2. The zoom lens system as claimed in claim 1, satisfying the following condition (I-3):

$$0.8 < (n_{11}-1)^2 < 1.5 \quad (I\text{-}3)$$

(wherein, $3.2 < f_T/f_W$ and $\omega_W > 35$)
where, $n_{11}$ is a refractive index of the first lens element to the d-line, $\omega_W$ is a half view angle (°) at a wide-angle limit, $f_T$ is a focal length of the entire system at a telephoto limit, and $f_W$ is a focal length of the entire system at a wide-angle limit.

3. The zoom lens system as claimed in claim 1, satisfying the following condition (I-4):

$$0.75 < (n_{11}-1) \cdot f_W/r_{12} < 1.2 \quad (I\text{-}4)$$

(wherein, $3.2 < f_T/f_W$ and $\omega_W > 35$)
where, $r_{12}$ is a radius of curvature of the image side surface of the first lens element, $n_{11}$ is a refractive index of the first lens element to the d-line, $\omega_W$ is a half view angle (°) at a wide-angle limit, $f_T$ is a focal length of the entire system at a telephoto limit, and $f_W$ is a focal length of the entire system at a wide-angle limit.

4. The zoom lens system as claimed in claim 1, satisfying the following condition (6):

$$0.0001 < (n_{11}-1) \cdot (n_{12}-1) \cdot d^2 \cdot f_W / (r_{12} \cdot r_{21} \cdot f_t) < 0.04 \quad (6)$$

(wherein, $3.2 < f_T/f_W$ and $\omega_W > 35$)
where, $n_{11}$ is a refractive index of the first lens element to the d-line, $n_{12}$ is a refractive index of the second lens element to the d-line, $r_{12}$ is a radius of curvature of the image side surface of the first lens element, $r_{21}$ is a radius of curvature of the object side surface of the second lens element, d is an optical axial distance between the image side surface of the first lens element and the object side surface of the second lens element, $\omega_W$ is a half view angle (°) at a wide-angle limit, $f_T$ is a focal length of the entire system at a telephoto limit, and $f_W$ is a focal length of the entire system at a wide-angle limit.

5. The zoom lens system as claimed in claim 1, satisfying the following condition (9):

$$2.4 < |f_{G1}|/f_W < 4.0 \quad (9)$$

(wherein, $3.2 < f_T/f_W$ and $\omega_W > 35$)
where, $f_{G1}$ is a composite focal length of the first lens unit, $\omega_W$ is a half view angle (°) at a wide-angle limit, $f_T$ is a focal length of the entire system at a telephoto limit, and $f_W$ is a focal length of the entire system at a wide-angle limit.

6. The zoom lens system as claimed in claim 1, satisfying the following condition (10):

$$1.85 < f_{G2}/f_W < 3.0 \quad (10)$$

(wherein, $3.2 < f_T/f_W$ and $\omega_W > 35$)
where, $f_{G2}$ is a composite focal length of the second lens unit, $\omega_W$ is a half view angle (°) at a wide-angle limit, $f_T$ is a focal length of the entire system at a telephoto limit, and $f_W$ is a focal length of the entire system at a wide-angle limit.

7. The zoom lens system as claimed in claim 1, satisfying the following condition (11):

$$2.5 < f_{G3}/f_W < 6.0 \quad (11)$$

(wherein, $3.2 < f_T/f_W$ and $\omega_W > 35$)
where, $f_{G3}$ is a composite focal length of the third lens unit, $\omega_W$ is a half view angle (°) at a wide-angle limit, $f_T$ is a focal length of the entire system at a telephoto limit, and $f_W$ is a focal length of the entire system at a wide-angle limit.

8. The zoom lens system as claimed in claim 1, satisfying the following condition (12):

$$1.0 < |f_{L1}|/f_W < 2.5 \quad (12)$$

(wherein, $3.2 < f_T/f_W$ and $\omega_W > 35$)
where, $f_{L1}$ is a focal length of the first lens element, $\omega_W$ is a half view angle (°) at a wide-angle limit, $f_T$ is a focal length of the entire system at a telephoto limit, and $f_W$ is a focal length of the entire system at a wide-angle limit.

9. The zoom lens system as claimed in claim 1, satisfying the following condition (13):

$$2.0 < f_{L2}/f_W < 5.0 \qquad (13)$$

(wherein, $3.2 < f_T/f_W$ and $\omega_W > 35$)
where,
$f_{L2}$ is a focal length of the second lens element,
$\omega_W$ is a half view angle (°) at a wide-angle limit,
$f_T$ is a focal length of the entire system at a telephoto limit, and
$f_W$ is a focal length of the entire system at a wide-angle limit.

10. The zoom lens system as claimed in claim 1, satisfying the following condition (14):

$$0.4 < |f_{L1}|/|f_{G1}| < 0.8 \qquad (14)$$

(wherein, $3.2 < f_T/f_W$ and $\omega_W > 35$)
where,
$f_{L1}$ is a focal length of the first lens element,
$f_{G1}$ is a composite focal length of the first lens unit,
$\omega_W$ is a half view angle (°) at a wide-angle limit,
$f_T$ is a focal length of the entire system at a telephoto limit, and
$f_W$ is a focal length of the entire system at a wide-angle limit.

11. The zoom lens system as claimed in claim 1, satisfying the following condition (15):

$$0.85 < f_{L2}/|f_{G1}| < 2.0 \qquad (15)$$

(wherein, $3.2 < f_T/f_W$ and $\omega_W > 35$)
where,
$f_{L2}$ is a focal length of the second lens element,
$f_{G1}$ is a composite focal length of the first lens unit,
$\omega_W$ is a half view angle (°) at a wide-angle limit,
$f_T$ is a focal length of the entire system at a telephoto limit, and
$f_W$ is a focal length of the entire system at a wide-angle limit.

12. The zoom lens system as claimed in claim 1, satisfying the following condition (16):

$$1.9 < f_{L2}/|f_{L1}| < 3.0 \qquad (16)$$

(wherein, $3.2 < f_T/f_W$ and $\omega_W > 35$)
where,
$f_{L1}$ is a focal length of the first lens element,
$f_{L2}$ is a focal length of the second lens element,
$\omega_W$ is a half view angle (°) at a wide-angle limit,
$f_T$ is a focal length of the entire system at a telephoto limit, and
$f_W$ is a focal length of the entire system at a wide-angle limit.

13. The zoom lens system as claimed in claim 1, wherein the second lens unit moves in a direction perpendicular to the optical axis.

14. An imaging device capable of outputting an optical image of an object as an electric image signal, comprising:
a zoom lens system that forms the optical image of the object; and
an image sensor that converts the optical image formed by the zoom lens system into the electric image signal, wherein
in the zoom lens system,
the system, in order from the object side to the image side, comprises a first lens unit having negative optical power, a second lens unit having positive optical power and a third lens unit having positive optical power, wherein
the first lens unit, in order from the object side to the image side, consists of a first lens element that has a concave surface at least on the image side and that has negative optical power and a second lens element that has a convex surface at least on the object side and that has positive optical power,
the second lens unit, in order from the object side to the image side, comprises a third lens element being one single lens element, a cemented lens element fabricated by cementing a fourth lens element and a fifth lens element having optical power of mutually different signs, and a sixth lens element being one single lens element,
in zooming from a wide-angle limit to a telephoto limit, all of the first lens unit, the second lens unit and the third lens unit move along an optical axis, and
the following conditions (1), (I-2) and (5) are satisfied:

$$5.0 < \alpha i_W < 20.0 \qquad (1)$$

$$n_{11} \geq 1.9 \qquad (I\text{-}2)$$

$$0.1 < (n_{11}-1)\cdot(n_{12}-1)\cdot d\cdot f_W/(r_{12}\cdot r_{21}) < 0.3 \qquad (5)$$

(wherein, $3.2 < f_T/f_W$ and $\omega_W > 35$)
where,
$\alpha i_W$ is an incident angle of a principal ray to an image sensor at a maximum image height at a wide-angle limit (defined as positive when the principal ray is incident on a light acceptance surface of the image sensor in a state of departing from the optical axis),
$n_{11}$ is a refractive index of the first lens element to the d-line,
$n_{12}$ is a refractive index of the second lens element to the d-line,
$r_{12}$ is a radius of curvature of the image side surface of the first lens element,
$r_{21}$ is a radius of curvature of the object side surface of the second lens element,
$d$ is an optical axial distance between the image side surface of the first lens element and the object side surface of the second lens element,
$\omega_W$ is a half view angle (°) at a wide-angle limit,
$f_T$ is a focal length of the entire system at a telephoto limit, and
$f_W$ is a focal length of the entire system at a wide-angle limit.

15. A camera for converting an optical image of an object into an electric image signal and then performing at least one of displaying and storing of the converted image signal, comprising
an imaging device having a zoom lens system that forms the optical image of the object and an image sensor that converts the optical image formed by the zoom lens system into the electric image signal, wherein
in the zoom lens system,
the system, in order from the object side to the image side, comprises a first lens unit having negative optical power, a second lens unit having positive optical power and a third lens unit having positive optical power, wherein
the first lens unit, in order from the object side to the image side, consists of a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1), (I-2) and (5) are satisfied:

$$5.0 < \alpha i_W < 20.0 \quad (1)$$

$$n_{11} \geq 1.9 \quad (\text{I-2})$$

$$0.1 < (n_{11}-1)\cdot(n_{12}-1)\cdot d \cdot f_W/(r_{12}\cdot r_{21}) < 0.3 \quad (5)$$

(wherein, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{11}$ is a refractive index of the first lens element to the d-line, $n_{12}$ is a refractive index of the second lens element to the d-line, $r_{12}$ is a radius of curvature of the image side surface of the first lens element, $r_{21}$ is a radius of curvature of the object side surface of the second lens element, d is an optical axial distance between the image side surface of the first lens element and the object side surface of the second lens element, $\omega_W$ is a half view angle (°) at a wide-angle limit, $f_T$ is a focal length of the entire system at a telephoto limit, and $f_W$ is a focal length of the entire system at a wide-angle limit.

16. A zoom lens system, in order from the object side to the image side, comprising a first lens unit having negative optical power, a second lens unit having positive optical power and a third lens unit having positive optical power, wherein the first lens unit, in order from the object side to the image side, consists of a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1), (II-2) and (5) are satisfied:

$$5.0 < \alpha i_W < 20.0 \quad (1)$$

$$(n_{11}-1)\cdot(n_{12}-1) \geq 0.84 \quad (\text{II-2})$$

$$0.1 < (n_{11}-1)\cdot(n_{12}-1)\cdot d \cdot f_W/(r_{12}\cdot r_{21}) < 0.3 \quad (5)$$

(wherein, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{11}$ is a refractive index of the first lens element to the d-line, $n_{12}$ is a refractive index of the second lens element to the d-line, $r_{12}$ is a radius of curvature of the image side surface of the first lens element, $r_{21}$ is a radius of curvature of the object side surface of the second lens element, d is an optical axial distance between the image side surface of the first lens element and the object side surface of the second lens element, $\omega_W$ is a half view angle (°) at a wide-angle limit, $f_T$ is a focal length of the entire system at a telephoto limit, and $f_W$ is a focal length of the entire system at a wide-angle limit.

17. The zoom lens system as claimed in claim 16, satisfying the following condition (6):

$$0.0001 < (n_{11}-1)\cdot(n_{12}-1)\cdot d^2 \cdot f_W/(r_{12}\cdot r_{21}\cdot f_t) < 0.04 \quad (6)$$

(wherein, $3.2 < f_T/f_W$ and $\omega_W > 35$) where, $n_{11}$ is a refractive index of the first lens element to the d-line, $n_{12}$ is a refractive index of the second lens element to the d-line, $r_{12}$ is a radius of curvature of the image side surface of the first lens element, $r_{21}$ is a radius of curvature of the object side surface of the second lens element, d is an optical axial distance between the image side surface of the first lens element and the object side surface of the second lens element, $\omega_W$ is a half view angle (°) at a wide-angle limit, $f_T$ is a focal length of the entire system at a telephoto limit, and $f_W$ is a focal length of the entire system at a wide-angle limit.

18. The zoom lens system as claimed in claim 16, satisfying the following condition (9):

$$2.4 < |f_{G1}|/f_W < 4.0 \quad (9)$$

(wherein, $3.2 < f_T/f_W$ and $\omega_W > 35$) where, $f_{G1}$ is a composite focal length of the first lens unit, $\omega_W$ is a half view angle (°) at a wide-angle limit, $f_T$ is a focal length of the entire system at a telephoto limit, and $f_W$ is a focal length of the entire system at a wide-angle limit.

19. The zoom lens system as claimed in claim 16, satisfying the following condition (10):

$$1.85 < f_{G2}/f_W < 3.0 \quad (10)$$

(wherein, $3.2 < f_T/f_W$ and $\omega_W > 35$) where, $f_{G2}$ is a composite focal length of the second lens unit, $\omega_W$ is a half view angle (°) at a wide-angle limit, $f_T$ is a focal length of the entire system at a telephoto limit, and $f_W$ is a focal length of the entire system at a wide-angle limit.

20. The zoom lens system as claimed in claim 16, satisfying the following condition (11):

$$2.5 < f_{G3}/f_W < 6.0 \quad (11)$$

(wherein, $3.2 < f_T/f_W$ and $\omega_W > 35$)
where,
$f_{G3}$ is a composite focal length of the third lens unit,
$\omega_W$ is a half view angle (°) at a wide-angle limit,
$f_T$ is a focal length of the entire system at a telephoto limit, and
$f_W$ is a focal length of the entire system at a wide-angle limit.

21. The zoom lens system as claimed in claim 16, satisfying the following condition (12):

$$1.0 < |f_{L1}|/f_W < 2.5 \quad (12)$$

(wherein, $3.2 < f_T/f_W$ and $\omega_W > 35$)
where,
$f_{L1}$ is a focal length of the first lens element,
$\omega_W$ is a half view angle (°) at a wide-angle limit,
$f_T$ is a focal length of the entire system at a telephoto limit, and
$f_W$ is a focal length of the entire system at a wide-angle limit.

22. The zoom lens system as claimed in claim 16, satisfying the following condition (13):

$$2.0 < f_{L2}/f_W < 5.0 \quad (13)$$

(wherein, $3.2 < f_T/f_W$ and $\omega_W > 35$)
where,
$f_{L2}$ is a focal length of the second lens element,
$\omega_W$ is a half view angle (°) at a wide-angle limit,
$f_T$ is a focal length of the entire system at a telephoto limit, and
$f_W$ is a focal length of the entire system at a wide-angle limit.

23. The zoom lens system as claimed in claim 16, satisfying the following condition (14):

$$0.4 < |f_{L1}|/|f_{G1}| < 0.8 \quad (14)$$

(wherein, $3.2 < f_T/f_W$ and $\omega_W > 35$)
where,
$f_{L1}$ is a focal length of the first lens element,
$f_{G1}$ is a composite focal length of the first lens unit,
$\omega_W$ is a half view angle (°) at a wide-angle limit,
$f_T$ is a focal length of the entire system at a telephoto limit, and
$f_W$ is a focal length of the entire system at a wide-angle limit.

24. The zoom lens system as claimed in claim 16, satisfying the following condition (15):

$$0.85 < f_{L2}/|f_{G1}| < 2.0 \quad (15)$$

(wherein, $3.2 < f_T/f_W$ and $\omega_W > 35$)
where,
$f_{L2}$ is a focal length of the second lens element,
$f_{G1}$ is a composite focal length of the first lens unit,
$\omega_W$ is a half view angle (°) at a wide-angle limit,
$f_T$ is a focal length of the entire system at a telephoto limit, and
$f_W$ is a focal length of the entire system at a wide-angle limit.

25. The zoom lens system as claimed in claim 16, satisfying the following condition (16):

$$1.9 < f_{L2}/|f_{L1}| < 3.0 \quad (16)$$

(wherein, $3.2 < f_T/f_W$ and $\omega_W > 35$)
where, $f_{L1}$ is a focal length of the first lens element,
$f_{L2}$ is a focal length of the second lens element,
$\omega_W$ is a half view angle (°) at a wide-angle limit,
$f_T$ is a focal length of the entire system at a telephoto limit, and
$f_W$ is a focal length of the entire system at a wide-angle limit.

26. The zoom lens system as claimed in claim 16, wherein the second lens unit moves in a direction perpendicular to the optical axis.

27. An imaging device capable of outputting an optical image of an object as an electric image signal, comprising:
a zoom lens system that forms the optical image of the object; and
an image sensor that converts the optical image formed by the zoom lens system into the electric image signal, wherein
in the zoom lens system,
the system, in order from the object side to the image side, comprises a first lens unit having negative optical power, a second lens unit having positive optical power and a third lens unit having positive optical power, wherein
the first lens unit, in order from the object side to the image side, consists of a first lens element that has a concave surface at least on the image side and that has negative optical power and a second lens element that has a convex surface at least on the object side and that has positive optical power,
the second lens unit, in order from the object side to the image side, comprises a third lens element being one single lens element, a cemented lens element fabricated by cementing a fourth lens element and a fifth lens element having optical power of mutually different signs, and a sixth lens element being one single lens element,
in zooming from a wide-angle limit to a telephoto limit, all of the first lens unit, the second lens unit and the third lens unit move along an optical axis, and
the following conditions (1), (II-2) and (5) are satisfied:

$$5.0 < \alpha i_W < 20.0 \quad (1)$$

$$(n_{11}-1) \cdot (n_{12}-1) \geq 0.84 \quad (\text{II-2})$$

$$0.1 < (n_{11}-1) \cdot (n_{12}-1) \cdot d \cdot f_W/(r_{12} \cdot r_{21}) < 0.3 \quad (5)$$

(wherein, $3.2 < f_T/f_W$ and $\omega_W > 35$)
where,
$\alpha i_W$ is an incident angle of a principal ray to an image sensor at a maximum image height at a wide-angle limit (defined as positive when the principal ray is incident on a light acceptance surface of the image sensor in a state of departing from the optical axis),
$n_{11}$ is a refractive index of the first lens element to the d-line,
$n_{12}$ is a refractive index of the second lens element to the d-line,
$r_{12}$ is a radius of curvature of the image side surface of the first lens element,
$r_{21}$ is a radius of curvature of the object side surface of the second lens element,
d is an optical axial distance between the image side surface of the first lens element and the object side surface of the second lens element,
$\omega_W$ is a half view angle (°) at a wide-angle limit,
$f_T$ is a focal length of the entire system at a telephoto limit, and $f_W$ is a focal length of the entire system at a wide-angle limit.

28. A camera for converting an optical image of an object into an electric image signal and then performing at least one of displaying and storing of the converted image signal, comprising
an imaging device having a zoom lens system that forms the optical image of the object and an image sensor that converts the optical image formed by the zoom lens system into the electric image signal, wherein
in the zoom lens system,
the system, in order from the object side to the image side, comprises a first lens unit having negative optical power, a second lens unit having positive optical power and a third lens unit having positive optical power, wherein
the first lens unit, in order from the object side to the image side, consists of a first lens element that has a concave surface at least on the image side and that has negative optical power and a second lens element that has a convex surface at least on the object side and that has positive optical power,
the second lens unit, in order from the object side to the image side, comprises a third lens element being one single lens element, a cemented lens element fabricated by cementing a fourth lens element and a fifth lens element having optical power of mutually different signs, and a sixth lens element being one single lens element,
in zooming from a wide-angle limit to a telephoto limit, all of the first lens unit, the second lens unit and the third lens unit move along an optical axis, and
the following conditions (1), (II-2) and (5) are satisfied:

$$5.0 < \alpha i_W < 20.0 \tag{1}$$

$$(n_{11}-1) \cdot (n_{12}-1) \geq 0.84 \tag{II-2}$$

$$0.1 < (n_{11}-1) \cdot (n_{12}-1) \cdot d \cdot f_W / (r_{12} \cdot r_{21}) < 0.3 \tag{5}$$

(wherein, $3.2 < f_T/f_W$ and $\omega_W > 35$)
where,
$\alpha i_W$ is an incident angle of a principal ray to an image sensor at a maximum image height at a wide-angle limit (defined as positive when the principal ray is incident on a light acceptance surface of the image sensor in a state of departing from the optical axis),
$n_{11}$ is a refractive index of the first lens element to the d-line,
$n_{12}$ is a refractive index of the second lens element to the d-line,
$r_{12}$ is a radius of curvature of the image side surface of the first lens element,
$r_{21}$ is a radius of curvature of the object side surface of the second lens element,
d is an optical axial distance between the image side surface of the first lens element and the object side surface of the second lens element,
$\omega_W$ is a half view angle (°) at a wide-angle limit,
$f_T$ is a focal length of the entire system at a telephoto limit, and
$f_W$ is a focal length of the entire system at a wide-angle limit.

29. A zoom lens system, in order from the object side to the image side, comprising a first lens unit having negative optical power, a second lens unit having positive optical power and a third lens unit having positive optical power, wherein
the first lens unit, in order from the object side to the image side, consists of a first lens element that has a concave surface at least on the image side and that has negative optical power and a second lens element that has a convex surface at least on the object side and that has positive optical power,
the second lens unit, in order from the object side to the image side, comprises a third lens element being one single lens element, a cemented lens element fabricated by cementing a fourth lens element and a fifth lens element having optical power of mutually different signs, and a sixth lens element being one single lens element,
in zooming from a wide-angle limit to a telephoto limit, all of the first lens unit, the second lens unit and the third lens unit move along an optical axis, and
the following conditions (1), (III-2) and (5) are satisfied:

$$5.0 < \alpha i_W < 20.0 \tag{1}$$

$$n_{12} \geq 2.1 \tag{III-2}$$

$$0.1 < (n_{11}-1) \cdot (n_{12}-1) \cdot d \cdot f_W / (r_{12} \cdot r_{21}) < 0.3 \tag{5}$$

(wherein, $3.2 < f_T/f_W$ and $\omega_W > 35$)
where,
$\alpha i_W$ is an incident angle of a principal ray to an image sensor at a maximum image height at a wide-angle limit (defined as positive when the principal ray is incident on a light acceptance surface of the image sensor in a state of departing from the optical axis),
$n_{11}$ is a refractive index of the first lens element to the d-line,
$n_{12}$ is a refractive index of the second lens element to the d-line,
$r_{12}$ is a radius of curvature of the image side surface of the first lens element,
$r_{21}$ is a radius of curvature of the object side surface of the second lens element,
d is an optical axial distance between the image side surface of the first lens element and the object side surface of the second lens element,
$\omega_W$ is a half view angle (°) at a wide-angle limit,
$f_T$ is a focal length of the entire system at a telephoto limit, and
$f_W$ is a focal length of the entire system at a wide-angle limit.

30. The zoom lens system as claimed in claim 29, satisfying the following condition (III-3):

$$0.8 < (n_{12}-1)^2 < 1.5 \tag{III-3}$$

(wherein, $3.2 < f_T/f_W$ and $\omega_W > 35$)
where,
$n_{12}$ is a refractive index of the second lens element to the d-line,
$\omega_W$ is a half view angle (°) at a wide-angle limit,
$f_T$ is a focal length of the entire system at a telephoto limit, and
$f_W$ is a focal length of the entire system at a wide-angle limit.

31. The zoom lens system as claimed in claim 29, satisfying the following condition (III-4):

$$0.4 < (n_{12}-1) \cdot f_W/r_{21} < 0.7 \tag{III-4}$$

(wherein, $3.2 < f_T/f_W$ and $\omega_W > 35$)
where,
$r_{21}$ is a radius of curvature of the object side surface of the second lens element,
$n_{12}$ is a refractive index of the second lens element to the d-line,
$\omega_W$ is a half view angle (°) at a wide-angle limit, $f_T$ is a focal length of the entire system at a telephoto limit, and $f_W$ is a focal length of the entire system at a wide-angle limit.

32. The zoom lens system as claimed in claim 29, satisfying the following condition (6):

$$0.0001 < (n_{11}-1) \cdot (n_{12}-1) \cdot d^2 f_W / (r_{12} \cdot r_{21} \cdot f_t) < 0.04 \qquad (6)$$

(wherein, $3.2 < f_T/f_W$ and $\omega_W > 35$)
where,
$n_{11}$ is a refractive index of the first lens element to the d-line,
$n_{12}$ is a refractive index of the second lens element to the d-line,
$r_{12}$ is a radius of curvature of the image side surface of the first lens element,
$r_{21}$ is a radius of curvature of the object side surface of the second lens element,
d is an optical axial distance between the image side surface of the first lens element and the object side surface of the second lens element,
$\omega_W$ is a half view angle (°) at a wide-angle limit,
$f_T$ is a focal length of the entire system at a telephoto limit, and
$f_W$ is a focal length of the entire system at a wide-angle limit.

33. The zoom lens system as claimed in claim 29, satisfying the following condition (9):

$$2.4 < |f_{G1}|/f_W < 4.0 \qquad (9)$$

(wherein, $3.2 < f_T/f_W$ and $\omega_W > 35$)
where,
$f_{G1}$ is a composite focal length of the first lens unit,
$\omega_W$ is a half view angle (°) at a wide-angle limit,
$f_T$ is a focal length of the entire system at a telephoto limit, and
$f_W$ is a focal length of the entire system at a wide-angle limit.

34. The zoom lens system as claimed in claim 29, satisfying the following condition (10):

$$1.85 < f_{G2}/f_W < 3.0 \qquad (10)$$

(wherein, $3.2 < f_T/f_W$ and $\omega_W > 35$)
where,
$f_{G2}$ is a composite focal length of the second lens unit,
$\omega_W$ is a half view angle (°) at a wide-angle limit,
$f_T$ is a focal length of the entire system at a telephoto limit, and
$f_W$ is a focal length of the entire system at a wide-angle limit.

35. The zoom lens system as claimed in claim 29, satisfying the following condition (11):

$$2.5 < f_{G3}/f_W < 6.0 \qquad (11)$$

(wherein, $3.2 < f_T/f_W$ and $\omega_W > 35$)
where,
$f_{G3}$ is a composite focal length of the third lens unit,
$\omega_W$ is a half view angle (°) at a wide-angle limit,
$f_T$ is a focal length of the entire system at a telephoto limit, and
$f_W$ is a focal length of the entire system at a wide-angle limit.

36. The zoom lens system as claimed in claim 29, satisfying the following condition (12):

$$1.0 < |f_{L1}|/f_W < 2.5 \qquad (12)$$

(wherein, $3.2 < f_T/f_W$ and $\omega_W > 35$)
where, $f_{L1}$ is a focal length of the first lens element,
$\omega_W$ is a half view angle (°) at a wide-angle limit,
$f_T$ is a focal length of the entire system at a telephoto limit, and
$f_W$ is a focal length of the entire system at a wide-angle limit.

37. The zoom lens system as claimed in claim 29, satisfying the following condition (13):

$$2.0 < f_{L2}/f_W < 5.0 \qquad (13)$$

(wherein, $3.2 < f_T/f_W$ and $\omega_W > 35$)
where,
$f_{L2}$ is a focal length of the second lens element,
$\omega_W$ is a half view angle (°) at a wide-angle limit,
$f_T$ is a focal length of the entire system at a telephoto limit, and
$f_W$ is a focal length of the entire system at a wide-angle limit.

38. The zoom lens system as claimed in claim 29, satisfying the following condition (14):

$$0.4 < |f_{L1}|/|f_{G1}| < 0.8 \qquad (14)$$

(wherein, $3.2 < f_T/f_W$ and $\omega_W > 35$)
where,
$f_{L1}$ is a focal length of the first lens element,
$f_{G1}$ is a composite focal length of the first lens unit,
$\omega_W$ is a half view angle (°) at a wide-angle limit,
$f_T$ is a focal length of the entire system at a telephoto limit, and
$f_W$ is a focal length of the entire system at a wide-angle limit.

39. The zoom lens system as claimed in claim 29, satisfying the following condition (15):

$$0.85 < f_{L2}/|f_{G1}| < 2.0 \qquad (15)$$

(wherein, $3.2 < f_T/f_W$ and $\omega_W > 35$)
where,
$f_{L2}$ is a focal length of the second lens element,
$f_{G1}$ is a composite focal length of the first lens unit,
$\omega_W$ is a half view angle (°) at a wide-angle limit,
$f_T$ is a focal length of the entire system at a telephoto limit, and
$f_W$ is a focal length of the entire system at a wide-angle limit.

40. The zoom lens system as claimed in claim 29, satisfying the following condition (16):

$$1.9 < f_{L2}/|f_{L1}| < 3.0 \qquad (16)$$

(wherein, $3.2 < f_T/f_W$ and $\omega_W > 35$)
where,
$f_{L1}$ is a focal length of the first lens element,
$f_{L2}$ is a focal length of the second lens element,
$\omega_W$ is a half view angle (°) at a wide-angle limit,
$f_T$ is a focal length of the entire system at a telephoto limit, and
$f_W$ is a focal length of the entire system at a wide-angle limit.

41. The zoom lens system as claimed in claim 29, wherein the second lens unit moves in a direction perpendicular to the optical axis.

42. An imaging device capable of outputting an optical image of an object as an electric image signal, comprising:
a zoom lens system that forms the optical image of the object; and
an image sensor that converts the optical image formed by the zoom lens system into the electric image signal,
wherein in the zoom lens system, the system, in order from the object side to the image side, comprises a first lens unit having negative optical power, a second lens unit having positive optical power and a third lens unit having positive optical power, wherein the first lens unit, in order from the object side to the image side, consists of a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1), (III-2) and (5) are satisfied:

$$5.0 < \alpha i_W < 20.0 \tag{1}$$

$$n_{12} \geq 2.1 \tag{III-2}$$

$$0.1 < (n_{11}-1) \cdot (n_{12}-1) \cdot d \cdot f_W / (r_{12} \cdot r_{21}) < 0.3 \tag{5}$$

(wherein, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{11}$ is a refractive index of the first lens element to the d-line, $n_{12}$ is a refractive index of the second lens element to the d-line, $r_{12}$ is a radius of curvature of the image side surface of the first lens element, $r_{21}$ is a radius of curvature of the object side surface of the second lens element, d is an optical axial distance between the image side surface of the first lens element and the object side surface of the second lens element, $\omega_W$ is a half view angle (°) at a wide-angle limit, $f_T$ is a focal length of the entire system at a telephoto limit, and $f_W$ is a focal length of the entire system at a wide-angle limit.

43. A camera for converting an optical image of an object into an electric image signal and then performing at least one of displaying and storing of the converted image signal, comprising an imaging device having a zoom lens system that forms the optical image of the object and an image sensor that converts the optical image formed by the zoom lens system into the electric image signal, wherein in the zoom lens system, the system, in order from the object side to the image side, comprises a first lens unit having negative optical power, a second lens unit having positive optical power and a third lens unit having positive optical power, wherein the first lens unit, in order from the object side to the image side, consists of a first lens element that has a concave surface at least on the image side and that has negative optical power and a second lens element that has a convex surface at least on the object side and that has positive optical power, the second lens unit, in order from the object side to the image side, comprises a third lens element being one single lens element, a cemented lens element fabricated by cementing a fourth lens element and a fifth lens element having optical power of mutually different signs, and a sixth lens element being one single lens element, in zooming from a wide-angle limit to a telephoto limit, all of the first lens unit, the second lens unit and the third lens unit move along an optical axis, and the following conditions (1), (III-2) and (5) are satisfied:

$$5.0 < \alpha i_W < 20.0 \tag{1}$$

$$n_{12} \geq 2.1 \tag{III-2}$$

$$0.1 < (n_{11}-1) \cdot (n_{12}-1) \cdot d \cdot f_W / (r_{12} \cdot r_{21}) < 0.3 \tag{5}$$

(wherein, $3.2 < f_T/f_W$ and $\omega_W > 35$)

where, $\alpha i_W$ is an incident angle of a principal ray to an image sensor at a maximum image height at a wide-angle limit (defined as positive when the principal ray is incident on a light acceptance surface of the image sensor in a state of departing from the optical axis), $n_{11}$ is a refractive index of the first lens element to the d-line, $n_{12}$ is a refractive index of the second lens element to the d-line, $r_{12}$ is a radius of curvature of the image side surface of the first lens element, $r_{21}$ is a radius of curvature of the object side surface of the second lens element, d is an optical axial distance between the image side surface of the first lens element and the object side surface of the second lens element, $\omega_W$ is a half view angle (°) at a wide-angle limit, $f_T$ is a focal length of the entire system at a telephoto limit, and $f_W$ is a focal length of the entire system at a wide-angle limit.

* * * * *